(12) United States Patent
Wu et al.

(10) Patent No.: US 12,320,087 B2
(45) Date of Patent: Jun. 3, 2025

(54) SUBMERGED LIQUID INTAKE STRAINERS

(71) Applicants: THE UNITED STATES OF AMERICA AS REPRESENTED BY THE SECRETARY OF AGRICULTURE, Washington, DC (US); Matthew Allen Zolnowsky, Rapid City, SD (US)

(72) Inventors: Samuel Tze-Han Wu, Monrovia, CA (US); Matthew Allen Zolnowsky, Rapid City, SD (US)

( * ) Notice: Subject to any disclaimer, the term of this patent is extended or adjusted under 35 U.S.C. 154(b) by 396 days.

(21) Appl. No.: 17/859,051

(22) Filed: Jul. 7, 2022

(65) Prior Publication Data
US 2023/0024886 A1      Jan. 26, 2023

Related U.S. Application Data

(60) Provisional application No. 63/221,528, filed on Jul. 14, 2021.

(51) Int. Cl.
*E02B 1/00* (2006.01)
*B01D 35/027* (2006.01)

(52) U.S. Cl.
CPC .......... *E02B 1/006* (2013.01); *B01D 35/0273* (2013.01)

(58) Field of Classification Search
None
See application file for complete search history.

(56) References Cited

U.S. PATENT DOCUMENTS

| | | | | |
|---|---|---|---|---|
| 47,074 A | * | 3/1865 | Andries | B01D 39/00 |
| | | | | 210/318 |
| 53,584 A | * | 4/1866 | Dewey et al. | B01D 24/047 |
| | | | | 210/324 |
| 60,311 A | * | 12/1866 | Wiley | B01D 27/02 |
| | | | | 210/458 |

(Continued)

FOREIGN PATENT DOCUMENTS

| | | | | |
|---|---|---|---|---|
| JP | 2008036152 A | * | 2/2008 | |
| WO | WO-2009073994 A1 | * | 6/2009 | ........... B01D 29/117 |
| WO | WO-2024010986 A2 | * | 1/2024 | ............. E02B 1/006 |

OTHER PUBLICATIONS

"Anadromous Fish Strainers for Use in Wildland Drafting Operations"; Mar. 2003; printed from https://www.fs.fed.us/t-d/pubs/html/03511203/03511203.html.

(Continued)

*Primary Examiner* — Robert J Popovics

(57) ABSTRACT

The fish screen for a suction strainer includes at least one first plate having a central opening formed therethrough, a second plate, a helical spring, and a mesh bag. The helical spring has opposed first and second ends, with the first end secured to the at least one first plate and the second end secured to the second plate. The helical spring has first and second portions positioned respectively adjacent to the first and second ends. The second portion has a smaller diameter than a diameter of the first portion. The mesh bag releasably and removably covers and receives the at least one first plate, the second plate and the helical spring. The second portion of the helical spring is adapted for releasably holding a free end of a suction strainer received within an interior of the helical spring through the central opening of the at least one first plate.

11 Claims, 6 Drawing Sheets

(56) References Cited

U.S. PATENT DOCUMENTS

| | | | | |
|---|---|---|---|---|
| 81,386 A * | 8/1868 | Long et al. | ............ | B01D 29/111 210/460 |
| 93,339 A * | 8/1869 | Parrot | .................... | C02F 1/004 210/317 |
| RE4,165 E * | 10/1870 | Dewey et al. | ............ | 210/170.07 |
| 154,158 A * | 8/1874 | Spooner | ................. | B01D 35/05 210/242.1 |
| 167,546 A * | 9/1875 | Lefferts | .................... | C02F 3/327 210/252 |
| 173,268 A * | 2/1876 | Carter et al. | ........... | B01D 29/35 210/314 |
| 178,020 A * | 5/1876 | Mosher | .................... | C02F 1/004 210/170.07 |
| 180,087 A * | 7/1876 | Cole | ......................... | E02B 9/04 405/127 |
| 195,423 A * | 9/1877 | Vent | ..................... | B01D 17/0214 210/255 |
| 222,140 A * | 12/1879 | Lindsay | ................. | B01D 35/05 222/405 |
| 226,814 A * | 4/1880 | White | ..................... | B01F 23/23 261/6 |
| 243,446 A * | 6/1881 | Haggerty | ............... | B01D 35/30 285/192 |
| 248,886 A * | 11/1881 | Saal | .......................... | A01J 11/12 137/544 |
| 297,977 A * | 5/1884 | English | .................... | A47J 31/14 210/467 |
| 300,576 A * | 6/1884 | Cole | ......................... | E02B 9/04 405/127 |
| 304,318 A * | 9/1884 | Hean | ..................... | B01D 29/111 285/405 |
| 342,652 A * | 5/1886 | Thacher et al. | ... | B01D 24/4631 210/275 |
| 344,813 A * | 7/1886 | Bull et al. | ................ | E02B 9/04 210/284 |
| 345,773 A * | 7/1886 | Crane | ..................... | A01K 63/04 210/170.09 |
| 362,314 A * | 5/1887 | Revoir | .................... | B01D 24/04 210/314 |
| 364,599 A * | 6/1887 | Morris | ................... | B01D 29/39 210/286 |
| 373,377 A * | 11/1887 | Rice | ...................... | B01D 29/111 210/460 |
| 407,971 A * | 7/1889 | Siersdorfer | ............. | F16K 31/44 137/140 |
| 415,927 A * | 11/1889 | Stiles | ................... | B01F 23/454 210/220 |
| 423,129 A * | 3/1890 | Clark | ..................... | F04F 10/00 137/140 |
| 426,988 A * | 4/1890 | Crocker | ............... | C02F 1/5281 210/301 |
| 428,404 A * | 5/1890 | McLaren | ............ | B01D 29/111 210/460 |
| 485,551 A * | 11/1892 | Luscombe | ............ | B01D 29/39 210/460 |
| 485,983 A * | 11/1892 | Powell | ............... | E02D 29/073 210/156 |
| 532,939 A * | 1/1895 | Balch | ...................... | C02F 1/283 210/417 |
| 539,800 A * | 5/1895 | Durant | ................. | B01D 29/111 166/230 |
| 553,424 A * | 1/1896 | Ricks | .................. | B01D 35/153 210/279 |
| 557,735 A * | 4/1896 | Warren | ................. | B01D 21/245 285/275 |
| 599,971 A * | 3/1898 | Millstine | ................. | A01K 63/04 405/43 |
| 602,488 A * | 4/1898 | Tice | ...................... | B01D 35/28 D7/400 |
| 615,847 A * | 12/1898 | Hansen | ................. | B01D 29/111 166/227 |
| 616,364 A * | 12/1898 | Shreeve | ..................... | C02F 1/42 210/418 |
| 618,171 A * | 1/1899 | Giessel | ................. | F25D 31/002 62/319 |
| 620,451 A * | 2/1899 | Helwig | .................. | C02F 1/003 210/287 |
| 622,562 A * | 4/1899 | Sutton | .................. | B01D 33/067 137/140 |
| 623,782 A * | 4/1899 | Hammett | .................. | C02F 3/20 210/220 |
| 659,876 A * | 10/1900 | Shuman | ................ | B01D 29/19 210/357 |
| 664,833 A * | 1/1901 | Collins | .................. | B01D 29/33 166/170 |
| 664,974 A * | 1/1901 | Searing | .................. | B01D 29/111 210/489 |
| 671,685 A * | 4/1901 | Xander | ................. | B01D 24/005 210/264 |
| 704,012 A * | 7/1902 | Emerson | ................ | B01D 29/111 48/144 |
| 705,364 A * | 7/1902 | Kurtz | ...................... | C02F 3/327 210/315 |
| 715,554 A * | 12/1902 | Craine | ................... | C02F 1/283 210/406 |
| 740,365 A * | 9/1903 | Knight | .................. | B01D 29/111 210/486 |
| 756,517 A * | 4/1904 | Miller | ...................... | A01J 11/12 137/131 |
| 763,325 A * | 6/1904 | Roche | .................... | B01D 35/05 137/578 |
| 785,125 A * | 3/1905 | Shafer | ................... | B01D 21/245 D23/209 |
| 857,519 A * | 6/1907 | Foster | ..................... | F16L 55/24 285/283 |
| 866,560 A * | 9/1907 | Basye | .................... | E21B 43/088 29/896.61 |
| 869,558 A * | 10/1907 | Durbrow | ................ | B01D 24/04 210/283 |
| 880,240 A * | 2/1908 | Overhiser | .............. | B01D 35/02 210/411 |
| 882,030 A * | 3/1908 | Traulsen et al. | ........ | B01D 35/05 137/578 |
| 882,098 A * | 3/1908 | Chial | ...................... | E03C 1/042 137/565.17 |
| 894,339 A * | 7/1908 | Niemeier | .................. | E02B 9/04 405/127 |
| 897,418 A * | 9/1908 | Sheridan | ................. | B01D 29/39 210/460 |
| 901,733 A * | 10/1908 | O'Sullivan | .......... | A62C 3/0207 169/91 |
| 930,903 A * | 8/1909 | Tucker | ..................... | E02B 5/08 137/578 |
| 950,715 A * | 3/1910 | Brindle | .................. | B01D 29/03 210/463 |
| 954,269 A * | 4/1910 | Durkee | ..................... | C02F 1/78 210/242.1 |
| 969,364 A * | 9/1910 | Grootenhuis | .......... | B01D 33/06 210/354 |
| 1,033,745 A * | 7/1912 | Smith | .................... | B01D 29/114 210/396 |
| 1,058,133 A * | 4/1913 | Yourtree | ................ | B01D 36/001 210/313 |
| 1,060,616 A * | 5/1913 | Murray | ................. | B01D 35/147 210/299 |
| 1,066,104 A * | 7/1913 | Glauber | ................ | B01D 61/0022 137/544 |
| 1,070,788 A * | 8/1913 | Elliott | .................... | B04B 11/04 210/237 |
| 1,072,371 A * | 9/1913 | Stone | ...................... | B60K 15/06 137/577 |
| 1,077,132 A * | 10/1913 | Erickson | ................ | E02B 13/00 405/40 |
| 1,090,279 A * | 3/1914 | Cochran | ................ | F16K 31/46 210/430 |
| 1,109,385 A * | 9/1914 | Allison | ..................... | E03F 5/14 210/155 |

(56) References Cited

U.S. PATENT DOCUMENTS

| | | | | |
|---|---|---|---|---|
| 1,113,683 A * | 10/1914 | Pfahler | ............... | B01D 36/001 210/313 |
| 1,116,234 A * | 11/1914 | Brown | ............... | B01D 29/111 425/269 |
| 1,140,726 A * | 5/1915 | Warden | ............... | B01D 36/003 210/338 |
| 1,191,741 A * | 7/1916 | Scull | ............... | B01D 35/0273 184/6.24 |
| 1,200,126 A * | 10/1916 | Mitchell | ............... | C02F 1/325 210/205 |
| 1,202,723 A * | 10/1916 | Jackson | ............... | B01D 35/005 4/291 |
| 1,209,800 A * | 12/1916 | Barber | ............... | E21B 33/0355 137/236.1 |
| 1,230,971 A * | 6/1917 | Wilson | ............... | F04F 10/00 210/463 |
| 1,260,241 A * | 3/1918 | Minton | ............... | E21B 37/08 166/173 |
| 1,264,035 A * | 4/1918 | Elliott | ............... | B01D 29/03 210/498 |
| 1,274,121 A * | 7/1918 | White | ............... | B01D 29/17 210/162 |
| 1,300,653 A * | 4/1919 | Roper | ............... | B01D 35/153 210/136 |
| 1,315,615 A * | 9/1919 | Wahlman | ............... | E02B 9/04 405/127 |
| 1,329,171 A * | 1/1920 | Garry | ............... | B01D 29/58 415/121.2 |
| 1,371,143 A * | 3/1921 | Bradburn | ............... | E04D 13/08 210/460 |
| 1,378,929 A * | 5/1921 | Wurscher | ............... | F04B 53/1037 210/463 |
| 1,394,011 A * | 10/1921 | Hills | ............... | B01D 35/02 210/313 |
| 1,395,949 A * | 11/1921 | Wurscher | ............... | B01D 35/18 219/205 |
| 1,451,394 A * | 4/1923 | Hurst | ............... | E02B 1/006 210/162 |
| 1,486,034 A * | 3/1924 | Rhudy | ............... | E02B 1/006 210/157 |
| 1,502,552 A * | 7/1924 | Donnallan | ............... | F04B 53/1037 210/232 |
| 1,513,878 A * | 11/1924 | Anthony | ............... | B01D 33/06 210/160 |
| 1,516,693 A * | 11/1924 | Anthony | ............... | B01D 35/05 210/385 |
| 1,535,112 A * | 4/1925 | Duke | ............... | B01D 24/08 210/416.3 |
| 1,548,271 A * | 8/1925 | Lane | ............... | F04B 53/1037 210/317 |
| 1,568,796 A * | 1/1926 | Breer | ............... | F04B 53/1037 184/6.24 |
| 1,579,917 A * | 4/1926 | Deming | ............... | F04B 53/1037 210/242.1 |
| 1,585,409 A * | 5/1926 | Myers | ............... | E02B 13/00 210/170.1 |
| 1,595,134 A * | 8/1926 | Zimmermann | ...... | B01D 29/085 210/306 |
| 1,611,478 A * | 12/1926 | Massey | ............... | E02F 7/065 209/250 |
| 1,614,773 A * | 1/1927 | Baster | ............... | F01M 5/00 184/6.3 |
| 1,621,413 A * | 3/1927 | James | ............... | F04B 53/1037 210/242.1 |
| 1,644,248 A * | 10/1927 | Goldman | ............... | F04B 53/1037 210/242.1 |
| 1,658,830 A * | 2/1928 | Bingham | ............... | A61M 3/0279 239/315 |
| 1,690,958 A * | 11/1928 | Vallez | ............... | F04B 53/1037 210/486 |
| 1,694,743 A * | 12/1928 | Hinman | ............... | F04B 53/1037 210/460 |
| 1,706,160 A * | 3/1929 | Hinman | ............... | F04B 53/1037 210/460 |
| 1,722,626 A * | 7/1929 | Dean | ............... | F04B 53/1037 210/247 |
| 1,773,134 A * | 8/1930 | Fisher | ............... | F04B 53/1037 210/167.02 |
| 1,800,585 A * | 4/1931 | Woolson | ............... | B01D 35/0273 210/167.02 |
| 1,810,981 A * | 6/1931 | Noble | ............... | B01D 29/11 405/127 |
| 1,836,269 A * | 12/1931 | McKenzie | ............ | A01M 7/0082 210/172.4 |
| 1,842,043 A * | 1/1932 | Modra | ............... | F04B 53/10 417/181 |
| 1,886,893 A * | 11/1932 | Mohr | ............... | B01D 33/073 210/408 |
| 1,905,919 A * | 4/1933 | Levis | ............... | E02B 13/00 405/125 |
| 1,908,362 A * | 5/1933 | Jacobs | ............... | F04B 53/1037 210/460 |
| 1,940,208 A * | 12/1933 | Dieman | ............... | B01D 29/41 210/463 |
| 1,945,824 A * | 2/1934 | Saxe | ............... | F04B 53/1037 210/247 |
| 1,953,331 A * | 4/1934 | Armstrong | ............ | A62C 3/0292 239/153 |
| 1,967,785 A * | 7/1934 | Schacht | ............... | E03C 1/086 210/488 |
| 1,977,464 A * | 10/1934 | White | ............... | B01D 35/027 210/434 |
| 2,002,407 A * | 5/1935 | Lemke | ............... | B08B 9/0933 210/533 |
| 2,014,105 A * | 9/1935 | Dooley | ............... | B01D 27/005 210/493.2 |
| 2,015,274 A * | 9/1935 | Johnston | ............... | B05B 15/00 210/250 |
| 2,023,028 A * | 12/1935 | Offerdahl | ............... | A62C 29/00 169/70 |
| 2,024,646 A * | 12/1935 | Jones | ............... | B01D 24/12 210/275 |
| 2,057,779 A * | 10/1936 | Jacobs | ............... | B01D 35/027 210/172.3 |
| 2,067,439 A * | 1/1937 | Dooley | ............... | B01D 27/06 285/202 |
| 2,077,024 A * | 4/1937 | Tanner | ............... | A61C 17/12 417/151 |
| 2,084,587 A * | 6/1937 | McFarlin | ............... | F04B 53/1037 166/236 |
| 2,223,104 A * | 11/1940 | Hansen | ............... | E02B 5/085 210/354 |
| 2,249,020 A * | 7/1941 | McFarlin | ............... | F04B 53/1037 D23/210 |
| 2,261,915 A * | 11/1941 | Korte | ............... | F02M 37/10 310/87 |
| 2,270,116 A * | 1/1942 | Featherston | ........ | F04B 53/1037 210/247 |
| 2,294,179 A * | 8/1942 | Hawley | ............... | B01D 33/073 210/396 |
| 2,300,952 A * | 11/1942 | May | ............... | F04B 53/1037 210/463 |
| 2,306,297 A * | 12/1942 | Curtis | ............... | F02M 37/20 96/219 |
| 2,306,986 A * | 12/1942 | Tolman | ............... | B01D 39/2003 210/486 |
| 2,318,220 A * | 5/1943 | Haselwood | ......... | F04B 53/1037 285/275 |
| 2,331,332 A * | 10/1943 | Latta | ............... | A47L 9/1427 55/378 |
| 2,332,965 A * | 10/1943 | Ducommun | ......... | B01D 29/114 210/696 |
| 2,354,623 A * | 7/1944 | Tietig | ............... | B01D 29/52 222/626 |
| 2,361,231 A * | 10/1944 | Nebolsine | ............ | F04D 29/708 137/550 |
| 2,371,895 A * | 3/1945 | Kingman | ............... | B01D 35/027 210/457 |

(56) References Cited

U.S. PATENT DOCUMENTS

| | | | | |
|---|---|---|---|---|
| 2,372,286 A * | 3/1945 | Mieras | B01D 35/005 | 184/6.24 |
| 2,374,756 A * | 5/1945 | Kisch et al. | B01D 29/117 | 4/256.1 |
| 2,383,946 A * | 9/1945 | Tietig | B01F 23/23124 | 366/159.1 |
| 2,424,211 A * | 7/1947 | Webb | B01D 35/0273 | 419/57 |
| 2,453,952 A * | 11/1948 | White | B01D 29/58 | 210/489 |
| 2,457,051 A * | 12/1948 | Le Clair | B22F 7/002 | 428/553 |
| 2,460,084 A * | 1/1949 | Hebo | B01D 35/14 | 210/356 |
| 2,463,137 A * | 3/1949 | Bahlke | B01D 29/237 | 210/485 |
| 2,490,443 A * | 12/1949 | Knipper | B01D 35/02 | 210/315 |
| 2,503,455 A * | 4/1950 | Sheren | F04B 53/1037 | 210/318 |
| 2,512,877 A * | 6/1950 | Rike | B60P 3/225 | 251/144 |
| 2,521,094 A * | 9/1950 | Rein | B05B 15/30 | 55/505 |
| 2,529,827 A * | 11/1950 | Yarnell | B05B 7/2408 | 210/497.2 |
| 2,552,493 A * | 5/1951 | Newton | E03B 11/00 | 210/411 |
| 2,572,173 A * | 10/1951 | McFarlin | F04B 53/1037 | 210/460 |
| 2,580,209 A * | 12/1951 | Wiley | F16L 55/24 | 210/313 |
| 2,594,650 A * | 4/1952 | Huppertz | B01D 24/04 | 210/291 |
| 2,596,151 A * | 5/1952 | Hudson | E03F 7/10 | 210/241 |
| 2,597,728 A * | 5/1952 | Hink | A62C 25/005 | 210/418 |
| 2,608,302 A * | 8/1952 | Mattei, Jr. | B01D 29/21 | 210/493.1 |
| 2,654,434 A * | 10/1953 | Culleton | E02D 19/10 | 417/187 |
| 2,668,624 A * | 2/1954 | Wahlin | B01D 29/6484 | 210/460 |
| 2,678,728 A * | 5/1954 | Spodig | B03C 1/28 | 209/223.1 |
| 2,683,969 A * | 7/1954 | Mugnier | E02B 8/085 | 405/83 |
| 2,711,828 A * | 6/1955 | Webb | B01D 39/10 | 184/6.24 |
| 2,718,433 A * | 9/1955 | Poynor | A01G 25/097 | 405/36 |
| RE24,081 E * | 10/1955 | Webb et al. | B01D 29/58 | 210/489 |
| 2,743,016 A * | 4/1956 | Pick | B01D 29/46 | 210/488 |
| 2,754,003 A * | 7/1956 | Fenner | D06F 39/10 | 210/136 |
| 2,767,736 A * | 10/1956 | Lackinger | F15B 1/26 | 137/574 |
| 2,770,362 A * | 11/1956 | Paquin | B01D 35/027 | 210/172.4 |
| 2,774,569 A * | 12/1956 | Jacobsen | E02F 3/925 | 37/318 |
| 2,776,169 A * | 1/1957 | Aschenbrenner | A01G 25/06 | 239/602 |
| 2,783,893 A * | 3/1957 | Romanoff | A01K 63/04 | D23/209 |
| 2,788,125 A * | 4/1957 | Webb | B01D 35/05 | 210/DIG. 5 |
| 2,810,482 A * | 10/1957 | Kasten | B01D 29/48 | 210/497.1 |
| 2,863,396 A * | 12/1958 | Heintz | F16N 13/08 | 92/135 |
| 2,877,903 A * | 3/1959 | Veres | B01D 35/02 | 210/462 |
| 2,886,181 A * | 5/1959 | Wiedorn | F04B 53/1037 | 210/232 |
| 2,905,327 A * | 9/1959 | Phillips | B01D 35/027 | 210/457 |
| 2,907,466 A * | 10/1959 | Beddow | B01D 29/96 | 210/457 |
| 2,923,411 A * | 2/1960 | Oster | F04B 53/1037 | 210/438 |
| 2,957,579 A * | 10/1960 | McCombie | F04D 29/708 | 210/242.1 |
| 2,985,307 A * | 5/1961 | Grasmere | B01D 29/15 | 210/167.13 |
| 3,020,950 A * | 2/1962 | Schraivogel | B60K 15/077 | 137/574 |
| 3,022,053 A * | 2/1962 | Hoyt | B64D 37/22 | 261/50.1 |
| 3,023,905 A * | 3/1962 | McDougal | B01D 35/0273 | 210/438 |
| 3,037,636 A * | 6/1962 | McFarlin | F16L 55/24 | 210/429 |
| 3,049,171 A * | 8/1962 | Neuerburg | B60K 15/077 | 96/216 |
| 3,108,065 A * | 10/1963 | McMichael | B01D 35/26 | 210/172.3 |
| 3,108,440 A * | 10/1963 | Anderson | E02B 13/02 | 239/724 |
| 3,109,812 A * | 11/1963 | Mcaulay | F04D 29/708 | 210/242.1 |
| 3,117,584 A * | 1/1964 | Elenbaas | B08B 9/093 | 210/167.01 |
| 3,120,491 A * | 2/1964 | Kincaid | B01D 35/05 | 210/463 |
| 3,132,364 A * | 5/1964 | Oxley | E04H 4/1609 | 210/167.16 |
| 3,143,187 A * | 8/1964 | Stefan | F01M 11/00 | 184/6.24 |
| 3,160,588 A * | 12/1964 | Alarie | B01D 29/885 | 210/488 |
| 3,163,229 A * | 12/1964 | Salisbury | F04D 9/008 | 415/121.2 |
| 3,171,806 A * | 3/1965 | Schaffner | B01D 35/02 | 210/232 |
| 3,189,181 A * | 6/1965 | Couse | C02F 1/42 | 210/291 |
| 3,206,036 A * | 9/1965 | Hawley | E01H 1/108 | 210/486 |
| 3,263,811 A * | 8/1966 | Baker | E04H 4/1263 | 210/136 |
| 3,266,312 A * | 8/1966 | Coleman | G01F 23/68 | 210/86 |
| 3,269,540 A * | 8/1966 | Rosaen | B01D 35/147 | 210/314 |
| 3,282,428 A * | 11/1966 | Rosaen | B01D 35/157 | 210/314 |
| 3,291,313 A * | 12/1966 | Davis | B01D 33/801 | 210/354 |
| 3,292,792 A * | 12/1966 | Falkenberg | B01D 35/027 | 210/450 |
| 3,294,025 A * | 12/1966 | Niemeyer | F04D 29/606 | 417/370 |
| 3,301,402 A * | 1/1967 | Falkenberg | B01D 29/333 | 210/482 |
| 3,323,536 A * | 6/1967 | O'Connor | F04B 53/10 | 166/227 |
| 3,323,651 A * | 6/1967 | Hauxwell | B60K 15/077 | 210/172.3 |
| 3,348,686 A * | 10/1967 | Spitzer | B01D 35/027 | 210/167.16 |
| 3,381,822 A * | 5/1968 | Martin | E04H 4/1209 | 210/407 |
| 3,460,680 A * | 8/1969 | Domnick | C12M 1/26 | 210/489 |

(56) References Cited

U.S. PATENT DOCUMENTS

| | | | | |
|---|---|---|---|---|
| 3,495,714 A * | 2/1970 | Barton | A62C 33/00 | 210/460 |
| 3,556,406 A * | 1/1971 | King | A01G 25/097 | 239/731 |
| 3,613,894 A * | 10/1971 | Clegg, Jr. | A62C 33/00 | 210/276 |
| 3,643,802 A * | 2/1972 | Jackson, Jr. | B63B 13/02 | 210/172.3 |
| 3,658,128 A * | 4/1972 | Shobert | B01D 29/111 | 210/497.1 |
| 3,688,908 A * | 9/1972 | Myers | E04H 4/1654 | 210/167.16 |
| 3,722,686 A * | 3/1973 | Arnett | B01D 29/01 | 210/242.1 |
| 3,726,310 A * | 4/1973 | Coscia | B60K 15/077 | 210/172.3 |
| 3,744,640 A * | 7/1973 | Grover | B01D 39/1661 | 210/172.3 |
| 3,759,330 A * | 9/1973 | Rainey | B64D 1/16 | 169/53 |
| 3,762,562 A * | 10/1973 | Okuniewski | F16L 37/084 | 210/460 |
| 3,762,565 A * | 10/1973 | Okuniewski | F16L 37/0925 | 210/460 |
| 3,782,552 A * | 1/1974 | Wendell | B65D 88/54 | 210/242.1 |
| 3,783,888 A * | 1/1974 | Johnson | F04F 10/02 | 285/242 |
| 3,786,920 A * | 1/1974 | Raymond | B01D 35/143 | 210/90 |
| 3,794,446 A * | 2/1974 | Ost | F04B 53/1037 | 210/242.1 |
| 3,804,258 A * | 4/1974 | Okuniewski | B01D 29/23 | 285/259 |
| 3,805,856 A * | 4/1974 | McLennand | B67C 3/22 | 239/553.3 |
| 3,817,390 A * | 6/1974 | Maruniak | B01J 47/022 | 210/460 |
| 3,820,342 A * | 6/1974 | Stipanov | E02B 8/085 | 405/83 |
| 3,822,715 A * | 7/1974 | Rao | E02B 13/02 | 137/135 |
| 3,826,372 A * | 7/1974 | Bell | B01D 35/26 | 210/172.4 |
| 3,832,854 A * | 9/1974 | Metts | G05D 9/02 | 137/577 |
| 3,833,124 A * | 9/1974 | Sugiyama | B01D 35/027 | 210/460 |
| 3,840,123 A * | 10/1974 | McClure | B01D 29/682 | 210/167.01 |
| 3,843,520 A * | 10/1974 | Bottorf | B01D 35/05 | 210/393 |
| 3,875,059 A * | 4/1975 | Maschino | B01D 29/15 | 210/172.3 |
| 3,878,807 A * | 4/1975 | Reskusic | B63B 13/02 | 114/198 |
| 3,882,025 A * | 5/1975 | Talley, Jr. | B01D 33/11 | 210/377 |
| 3,900,397 A * | 8/1975 | Bell | B01D 29/15 | 210/194 |
| 3,927,534 A * | 12/1975 | Larson | E02B 1/006 | 405/127 |
| 3,947,362 A * | 3/1976 | Etani | B01D 29/111 | 210/457 |
| 3,957,006 A * | 5/1976 | Lapeyre | B63B 35/00 | 114/65 R |
| 3,959,138 A * | 5/1976 | Nichols | B01D 29/232 | 210/94 |
| 3,972,647 A * | 8/1976 | Niedermeyer | F04B 49/10 | 415/121.2 |
| 3,984,330 A * | 10/1976 | Nichols | B01D 29/232 | 210/460 |
| 3,987,572 A * | 10/1976 | Bieser | A01K 71/00 | 43/4.5 |
| 3,996,138 A * | 12/1976 | Daidola | E02B 1/006 | 210/170.11 |
| 4,017,394 A * | 4/1977 | Hensley | B01D 33/801 | 210/242.1 |
| 4,057,968 A * | 11/1977 | Scott | E02B 13/00 | 405/36 |
| 4,058,463 A * | 11/1977 | Bartik | B01D 29/58 | 210/493.1 |
| 4,058,465 A * | 11/1977 | McKee | B01D 35/02 | 210/488 |
| 4,064,046 A * | 12/1977 | Gilger | B01D 35/22 | 210/94 |
| 4,118,323 A * | 10/1978 | Sugiyama | B01D 29/111 | 210/441 |
| 4,123,361 A * | 10/1978 | Marschman | D06F 39/10 | 210/232 |
| 4,129,503 A * | 12/1978 | Joseph | B01D 29/055 | 210/232 |
| 4,152,264 A * | 5/1979 | Hanna, Sr. | B01D 21/0012 | 210/416.3 |
| 4,169,792 A * | 10/1979 | Dovel | B01D 33/50 | 210/411 |
| 4,179,379 A * | 12/1979 | Mitchell | B01D 29/01 | 210/242.1 |
| 4,184,963 A * | 1/1980 | Sternberg | B01D 69/106 | 427/244 |
| 4,187,178 A * | 2/1980 | Brown | B01D 29/05 | 210/232 |
| 4,192,749 A * | 3/1980 | Jackson | B01D 33/073 | 210/161 |
| 4,204,960 A * | 5/1980 | Sugiyama | B01D 29/96 | 210/438 |
| 4,210,539 A * | 7/1980 | Shiban | B01D 33/073 | 210/402 |
| 4,220,285 A * | 9/1980 | Gualdi | B05B 1/3452 | 239/493 |
| 4,224,161 A * | 9/1980 | Anderson | F01M 11/00 | 210/232 |
| 4,260,286 A * | 4/1981 | Buchanan | A01K 61/10 | 405/81 |
| 4,261,822 A * | 4/1981 | Richardson | B01D 33/801 | 210/161 |
| 4,263,139 A * | 4/1981 | Erlich | B01D 29/232 | 210/485 |
| 4,303,513 A * | 12/1981 | Lundquist | B01D 35/143 | 210/314 |
| 4,303,519 A * | 12/1981 | DelVecchio | B01D 29/27 | 210/238 |
| 4,304,664 A * | 12/1981 | McAlindon | B01D 17/10 | 210/172.3 |
| 4,310,423 A * | 1/1982 | Brown | B01D 35/05 | 210/791 |
| 4,312,753 A * | 1/1982 | Bell | B01D 35/26 | 210/416.4 |
| 4,318,233 A * | 3/1982 | Romain | E02F 3/9231 | 37/318 |
| 4,335,977 A * | 6/1982 | Ihli | E02B 3/04 | 210/170.03 |
| 4,337,008 A * | 6/1982 | Kulyabko | E02B 1/006 | 405/80 |
| 4,354,521 A * | 10/1982 | Harde | B60K 15/077 | 137/574 |
| 4,357,238 A * | 11/1982 | Ziaylek, Jr. | A62C 33/00 | 285/272 |
| 4,358,372 A * | 11/1982 | Lundquist | B01D 35/0273 | 210/172.6 |
| 4,411,788 A * | 10/1983 | Kimura | F02M 37/50 | 210/439 |
| 4,413,433 A * | 11/1983 | Duverne | E02F 3/06 | 37/190 |
| 4,415,462 A * | 11/1983 | Finch | E02B 5/08 | 210/162 |
| 4,420,396 A * | 12/1983 | Yamamoto | B01D 35/0273 | 210/232 |

(56) References Cited

U.S. PATENT DOCUMENTS

| | | | | |
|---|---|---|---|---|
| 4,428,835 A * | 1/1984 | Nagashima | B01D 29/70 | 210/220 |
| 4,437,431 A * | 3/1984 | Koch | E02B 8/085 | 405/83 |
| 4,523,992 A * | 6/1985 | Sackett | B01D 35/14 | 210/232 |
| 4,550,778 A * | 11/1985 | Sullivan | E21B 43/088 | 166/234 |
| 4,561,977 A * | 12/1985 | Sasaki | B01D 35/027 | 210/462 |
| 4,594,024 A * | 6/1986 | Jenkner | E02B 9/04 | 405/80 |
| 4,618,422 A * | 10/1986 | Sasaki | B01D 29/925 | 210/485 |
| 4,626,347 A * | 12/1986 | Neglio | B01D 35/05 | 210/232 |
| 4,645,600 A * | 2/1987 | Filippi | F02M 37/50 | 210/485 |
| 4,647,374 A * | 3/1987 | Ziaylek | B01D 35/05 | 210/242.1 |
| 4,652,369 A * | 3/1987 | DePolo | B01D 29/21 | 210/356 |
| 4,693,423 A * | 9/1987 | Roe | B05B 9/0861 | 239/525 |
| 4,717,477 A * | 1/1988 | Nagashima | B01D 35/02 | 210/232 |
| 4,743,370 A * | 5/1988 | Mizusawa | B01D 35/0273 | 210/460 |
| 4,822,486 A * | 4/1989 | Wilkins | B01D 33/073 | 210/393 |
| 4,834,138 A * | 5/1989 | Dellasso | E04H 4/10 | 137/590 |
| 4,844,704 A * | 7/1989 | Jiro | F02M 37/14 | 417/313 |
| 4,851,118 A * | 7/1989 | Kurihara | F02M 37/50 | 210/485 |
| 4,853,123 A * | 8/1989 | Hayes | F02M 37/50 | 210/416.4 |
| RE33,103 E * | 10/1989 | Nagashima | B01D 29/19 | 210/220 |
| 4,874,510 A * | 10/1989 | Akira | B01D 35/0273 | 210/462 |
| 4,961,850 A * | 10/1990 | Combest | B29C 66/729 | 210/507 |
| 4,966,522 A * | 10/1990 | Koyama | B01D 35/0273 | 417/313 |
| 4,970,880 A * | 11/1990 | Luger | D06F 39/10 | 68/208 |
| 4,973,403 A * | 11/1990 | Kozey | F04D 29/708 | 210/232 |
| 4,973,405 A * | 11/1990 | Kozey | B01D 29/33 | 169/30 |
| 4,989,572 A * | 2/1991 | Giacomazzi | F02M 37/0052 | 123/514 |
| 5,049,267 A * | 9/1991 | Sasaki | B01D 35/0273 | 210/172.3 |
| 5,049,271 A * | 9/1991 | Cain | B01D 29/15 | 210/323.1 |
| 5,052,855 A * | 10/1991 | Chapman | A01G 25/00 | 405/36 |
| 5,055,187 A * | 10/1991 | Ito | F02M 37/50 | 210/232 |
| 5,082,013 A * | 1/1992 | Scheib | E03B 3/04 | 137/272 |
| 5,084,166 A * | 1/1992 | Shiraga | F02M 37/50 | 415/121.2 |
| 5,089,108 A * | 2/1992 | Small | B01D 29/15 | 210/287 |
| 5,094,751 A * | 3/1992 | Ramsey | B01D 29/6438 | 210/411 |
| 5,108,592 A * | 4/1992 | Wilkins | B01D 33/073 | 239/723 |
| 5,111,844 A * | 5/1992 | Emmert | F02M 37/106 | 123/514 |
| 5,113,889 A * | 5/1992 | McGuire, Jr. | E03B 3/04 | 137/135 |
| 5,120,434 A * | 6/1992 | Yoshida | B01D 35/0273 | 210/232 |
| D327,693 S * | 7/1992 | Berry | D15/141 | |
| 5,152,637 A * | 10/1992 | Wayne | E02B 1/006 | 119/234 |
| 5,161,913 A * | 11/1992 | Boylan | E02B 8/085 | 405/83 |
| 5,164,089 A * | 11/1992 | Preston | C02F 3/06 | 210/615 |
| 5,169,531 A * | 12/1992 | Shiraga | B01D 35/26 | 415/121.2 |
| 5,186,152 A * | 2/1993 | Cortochiato | F02M 37/106 | 137/448 |
| 5,203,990 A * | 4/1993 | Gargiulo | A01K 63/045 | 119/261 |
| 5,215,656 A * | 6/1993 | Stoneburner | B01D 33/801 | 210/393 |
| 5,217,238 A * | 6/1993 | Cyphers | B05B 9/0403 | D34/24 |
| 5,218,942 A * | 6/1993 | Coha | F02M 37/18 | 123/514 |
| 5,227,050 A * | 7/1993 | Stephan | B01D 17/0214 | 210/330 |
| 5,248,089 A * | 9/1993 | Bekius | B05B 9/08 | 239/154 |
| 5,252,210 A * | 10/1993 | Kessel | B01D 29/23 | 55/525 |
| 5,257,643 A * | 11/1993 | Merrett | E02B 13/02 | 137/236.1 |
| 5,269,338 A * | 12/1993 | Figas | F04F 10/00 | 119/245 |
| 5,338,446 A * | 8/1994 | Schuman | E04H 4/1645 | 210/453 |
| 5,376,272 A * | 12/1994 | Spearman | B01D 35/02 | 210/473 |
| 5,392,806 A * | 2/1995 | Gallant | E03B 3/04 | 137/590 |
| 5,395,520 A * | 3/1995 | Ito | B01D 39/08 | 210/315 |
| 5,409,608 A * | 4/1995 | Yoshida | F02M 37/50 | 210/485 |
| 5,417,553 A * | 5/1995 | Gibson | F04D 29/606 | 417/366 |
| 5,435,464 A * | 7/1995 | Alexander | B67D 7/0205 | 222/105 |
| 5,435,916 A * | 7/1995 | Schwartz | B01D 29/15 | 210/489 |
| 5,441,637 A * | 8/1995 | Gutjahr | B01D 35/0273 | 210/485 |
| 5,476,595 A * | 12/1995 | Baddour | C02F 1/46104 | 210/243 |
| 5,478,465 A * | 12/1995 | Larson | B01D 29/90 | 210/336 |
| 5,489,379 A * | 2/1996 | Meenan | B41F 7/32 | 210/488 |
| 5,496,468 A * | 3/1996 | Cormier | B01D 29/58 | 210/172.3 |
| 5,509,437 A * | 4/1996 | Merrett | F16K 15/1402 | 137/513.5 |
| 5,525,222 A * | 6/1996 | Gleason | B01D 29/114 | 210/489 |
| 5,545,318 A * | 8/1996 | Richmond | B01D 29/15 | 210/232 |
| 5,545,319 A * | 8/1996 | Hart | B01D 29/15 | 210/291 |
| 5,547,568 A * | 8/1996 | Sasaki | F02M 37/50 | 210/232 |
| 5,558,462 A * | 9/1996 | O'Haver | A01K 79/02 | 210/242.1 |
| 5,567,323 A * | 10/1996 | Harrison, Jr. | B01D 29/15 | 210/DIG. 17 |

(56) References Cited

U.S. PATENT DOCUMENTS

| | | | | |
|---|---|---|---|---|
| 5,582,729 A * | 12/1996 | Shioda | F02M 37/103 | 210/416.4 |
| 5,584,988 A * | 12/1996 | Hashimoto | B01D 35/26 | 210/136 |
| 5,607,578 A * | 3/1997 | Ohkouchi | B01D 35/26 | 210/455 |
| 5,622,480 A * | 4/1997 | Walsh | F16L 3/02 | 417/313 |
| 5,622,620 A * | 4/1997 | Meenan | B41F 7/32 | 210/488 |
| 5,647,329 A * | 7/1997 | Bucci | F02M 37/50 | 123/509 |
| 5,650,073 A * | 7/1997 | Merrett | B01D 29/33 | 137/236.1 |
| 5,653,874 A * | 8/1997 | Berry, III | E02B 1/006 | 210/162 |
| 5,665,229 A * | 9/1997 | Fitzpatrick | F02M 37/50 | 210/232 |
| 5,690,710 A * | 11/1997 | Stephan | B01D 46/76 | 55/366 |
| 5,695,654 A * | 12/1997 | Schultz | A01K 63/006 | 210/780 |
| 5,696,801 A * | 12/1997 | Dwyer | G21C 19/307 | 376/282 |
| 5,702,237 A * | 12/1997 | Hill | B01D 29/114 | 417/313 |
| 5,720,878 A * | 2/1998 | Bolyard | B01D 63/00 | 210/337 |
| 5,723,044 A * | 3/1998 | Gleason | B01D 29/114 | 210/489 |
| 5,759,399 A * | 6/1998 | Bilanin | B01D 29/92 | 210/416.1 |
| 5,776,341 A * | 7/1998 | Barnard | B01D 35/027 | 210/462 |
| 5,795,468 A * | 8/1998 | Reising | B01D 35/0273 | 210/232 |
| 5,797,421 A * | 8/1998 | Merrett | A62C 35/68 | 137/513.5 |
| 5,820,751 A * | 10/1998 | Faircloth, Jr. | B01D 21/2444 | 210/242.1 |
| 5,835,549 A * | 11/1998 | Sibiga | B01D 29/333 | 210/493.1 |
| 5,842,639 A * | 12/1998 | Walker | B05B 15/40 | 239/DIG. 14 |
| 5,843,314 A * | 12/1998 | Dwyer | G21C 19/307 | 376/313 |
| 5,851,087 A * | 12/1998 | Berry, III | B01D 29/15 | 210/161 |
| 5,851,385 A * | 12/1998 | Merrett | B01D 29/33 | 137/236.1 |
| 5,899,111 A * | 5/1999 | Zellers | G01F 23/292 | 73/290 R |
| 5,922,197 A * | 7/1999 | Sparks | E03F 7/00 | 210/232 |
| 5,928,507 A * | 7/1999 | Chiga | B01D 35/0273 | 210/172.4 |
| 5,935,439 A * | 8/1999 | Hart | B01D 29/33 | 210/416.1 |
| 5,947,137 A * | 9/1999 | Sheafer | B05B 15/55 | 134/201 |
| 5,958,234 A * | 9/1999 | Dwyer | G21C 19/307 | 376/313 |
| 6,036,850 A * | 3/2000 | Reynolds | B01D 29/21 | 210/462 |
| 6,051,131 A * | 4/2000 | Maxson | E02B 5/08 | 210/162 |
| 6,051,132 A * | 4/2000 | Flores | A01K 63/045 | 210/232 |
| 6,076,994 A * | 6/2000 | Brockway | E03B 3/04 | 210/170.11 |
| 6,089,790 A * | 7/2000 | Berry, III | E03B 3/04 | 138/41 |
| 6,179,558 B1 * | 1/2001 | Eastman, III | B01D 46/00 | 415/121.2 |
| 6,209,593 B1 * | 4/2001 | Nichols, Sr. | B64D 1/16 | 141/2 |
| 6,210,573 B1 * | 4/2001 | Marshall | B01D 29/27 | 210/462 |
| 6,251,266 B1 * | 6/2001 | Gannon | B01D 35/05 | 210/242.1 |
| 6,261,452 B1 * | 7/2001 | Mayer | B01D 17/0211 | 210/256 |
| 6,270,669 B1 * | 8/2001 | Bauer | B01D 35/05 | 210/402 |
| 6,270,684 B1 * | 8/2001 | Schloss | B01D 33/461 | 210/791 |
| 6,272,874 B1 * | 8/2001 | Keeney | F04D 29/705 | 62/240 |
| 6,273,639 B1 * | 8/2001 | Eikrem | E02B 8/085 | 405/83 |
| 6,343,433 B1 * | 2/2002 | Granberg | A01K 79/00 | 43/6.5 |
| 6,343,589 B1 * | 2/2002 | Talaski | G05D 16/0658 | 123/514 |
| 6,364,119 B1 * | 4/2002 | Graham | E02F 3/9281 | 299/9 |
| 6,386,049 B1 * | 5/2002 | Schrumm | G01F 1/46 | 73/861.66 |
| 6,401,829 B1 * | 6/2002 | Newton | A62C 27/00 | 239/724 |
| 6,440,303 B2 * | 8/2002 | Spriegel | B01D 29/15 | 210/232 |
| 6,451,204 B1 * | 9/2002 | Anderson | E02B 5/085 | 210/162 |
| 6,471,072 B1 * | 10/2002 | Rickle | B01D 35/0273 | 210/488 |
| 6,482,321 B1 * | 11/2002 | Bossler | B01D 35/0273 | 210/485 |
| 6,488,846 B1 * | 12/2002 | Marangi | B01D 29/15 | 239/149 |
| 6,491,818 B2 * | 12/2002 | Dwyer | G21C 19/307 | 376/310 |
| 6,508,933 B2 * | 1/2003 | Wilkins | B01D 29/05 | 210/411 |
| 6,524,028 B2 * | 2/2003 | Bryan | A01K 61/00 | 405/83 |
| 6,533,941 B2 * | 3/2003 | Butler | E03F 5/0404 | 210/170.03 |
| 6,551,507 B2 * | 4/2003 | Gosling | B01D 29/33 | 210/232 |
| D475,761 S * | 6/2003 | Walker | D23/209 | |
| 6,582,599 B2 * | 6/2003 | Ito | B01D 35/0273 | 210/493.1 |
| 6,638,423 B2 * | 10/2003 | Dockery | F02M 37/50 | 210/172.3 |
| 6,638,435 B2 * | 10/2003 | Loreno | B01D 35/027 | 210/767 |
| 6,641,328 B1 * | 11/2003 | Smith | A01K 79/02 | 405/80 |
| 6,682,651 B1 * | 1/2004 | Toland | B01D 29/15 | 210/162 |
| 6,709,586 B2 * | 3/2004 | Mason | B01D 29/96 | 210/411 |
| 6,712,959 B2 * | 3/2004 | Ekholm | E02B 5/08 | 210/162 |
| 6,790,345 B2 * | 9/2004 | Broussard | B01D 24/008 | 210/243 |
| 6,805,160 B1 * | 10/2004 | Keichler | B01D 35/0273 | 137/550 |
| 6,821,422 B1 * | 11/2004 | Brzozowski | B01D 35/0273 | 210/416.4 |
| 6,830,687 B2 * | 12/2004 | Dockery | F02M 37/50 | 210/232 |
| 6,833,070 B2 * | 12/2004 | Fischer | B01D 35/26 | 210/232 |
| 6,857,819 B2 * | 2/2005 | Gunderson, III | B01D 17/0202 | 405/60 |

(56) References Cited

U.S. PATENT DOCUMENTS

| | | | | |
|---|---|---|---|---|
| 6,863,807 B2* | 3/2005 | Crawford, III | F04F 5/10 | 405/116 |
| 6,874,643 B2* | 4/2005 | Iwamoto | B01D 35/0273 | 210/486 |
| 6,875,346 B2* | 4/2005 | Fox | B01D 29/96 | 210/493.1 |
| 6,949,198 B2* | 9/2005 | Reber | E03B 3/04 | 210/170.1 |
| 6,953,524 B2* | 10/2005 | Woodbridge | B01D 29/6415 | 210/162 |
| 6,953,527 B2* | 10/2005 | Brower | B01D 36/003 | 210/313 |
| 6,953,528 B2* | 10/2005 | Nesfield | E02B 3/02 | 210/801 |
| 6,964,265 B2* | 11/2005 | Iwamoto | B01D 35/0273 | 210/232 |
| 6,964,541 B2* | 11/2005 | Bryan | A01K 61/00 | 405/83 |
| 6,978,900 B2* | 12/2005 | Natale | B01D 35/02 | 29/896.61 |
| 7,017,406 B1* | 3/2006 | Cressman | F04B 51/00 | 73/168 |
| 7,025,878 B2* | 4/2006 | Spriegel | B01D 29/46 | 210/232 |
| 7,029,582 B2* | 4/2006 | Sato | F02M 37/42 | 210/232 |
| 7,087,160 B2* | 8/2006 | Beer | F16H 57/0402 | 210/489 |
| 7,201,842 B2* | 4/2007 | Kiefer | B01D 35/02 | 210/162 |
| 7,207,320 B2* | 4/2007 | Ikeya | F02M 37/14 | 210/416.4 |
| 7,222,638 B1* | 5/2007 | Wong | E02B 3/10 | 137/590 |
| 7,241,384 B1* | 7/2007 | Torres-Collazo | B01D 35/05 | 210/232 |
| 7,255,064 B2 | 8/2007 | Yamamoto | | |
| 7,273,545 B1* | 9/2007 | Lloyd | A01K 63/045 | 210/162 |
| 7,294,257 B2* | 11/2007 | Jackson | B01D 29/114 | 210/416.1 |
| 7,344,644 B2* | 3/2008 | Haudenschild | B09C 1/002 | 210/291 |
| 7,347,933 B2* | 3/2008 | Berry, III | B01D 33/073 | 210/791 |
| D565,695 S* | 4/2008 | Wihk | | D23/209 |
| 7,407,057 B2* | 8/2008 | Vichinsky | B01D 27/08 | 156/308.2 |
| 7,429,322 B2* | 9/2008 | Fujita | F02M 37/34 | 210/172.6 |
| 7,478,729 B2* | 1/2009 | Sato | F02M 37/50 | 210/317 |
| 7,488,426 B1* | 2/2009 | Zaiter | B01D 29/54 | 210/345 |
| 7,501,058 B1* | 3/2009 | Lawrence, Sr. | B01D 33/073 | 210/232 |
| 7,575,677 B1* | 8/2009 | Barnes | B01D 29/111 | 210/172.3 |
| 7,644,776 B2* | 1/2010 | Holley | A62C 31/28 | 169/30 |
| 7,648,630 B2* | 1/2010 | Broussard | C02F 1/001 | 210/275 |
| 7,670,482 B2* | 3/2010 | Wietham | F04D 29/708 | 210/402 |
| 7,708,494 B2* | 5/2010 | McLaughlin | E02B 8/08 | 405/80 |
| 7,713,031 B2* | 5/2010 | Dane | F04B 19/04 | 415/7 |
| 7,776,222 B2* | 8/2010 | Glessner | C02F 1/001 | 405/218 |
| 7,780,013 B1* | 8/2010 | Kern | E03B 9/16 | 137/550 |
| 7,785,516 B2* | 8/2010 | Malkin | B01D 29/15 | 264/DIG. 48 |
| 7,794,589 B2* | 9/2010 | Kozey | B01D 35/05 | 210/242.1 |
| 7,862,713 B2* | 1/2011 | Justice | E03B 3/12 | 210/291 |
| 7,867,390 B1* | 1/2011 | Peterson | C02F 1/006 | 405/74 |
| 7,867,395 B2* | 1/2011 | Ekholm | B08B 9/00 | 210/411 |
| 7,901,572 B2* | 3/2011 | Sato | F02M 37/34 | 210/489 |
| 7,938,957 B2* | 5/2011 | Bolan | E03B 3/04 | 210/162 |
| 7,950,527 B2* | 5/2011 | Osborne | B01D 29/48 | 210/172.3 |
| 7,964,096 B2* | 6/2011 | Kimisawa | F02M 37/50 | 210/416.4 |
| 7,998,347 B2* | 8/2011 | Pekarsky | B01D 29/56 | 210/167.04 |
| 8,038,877 B2* | 10/2011 | Stausberg | F01M 11/0004 | 184/6.24 |
| 8,048,319 B2* | 11/2011 | Smith | G21C 15/182 | 210/167.01 |
| 8,052,868 B2* | 11/2011 | Sato | F02M 37/24 | 210/488 |
| 8,054,932 B2* | 11/2011 | Smith | C02F 1/001 | 210/167.01 |
| 8,075,700 B2* | 12/2011 | Ekholm | B01D 29/114 | 134/22.12 |
| 8,123,957 B2* | 2/2012 | Bolan | B01D 35/05 | 210/747.6 |
| 8,132,557 B2* | 3/2012 | Joos | F02M 37/007 | 210/443 |
| 8,137,546 B2* | 3/2012 | Ogose | B01D 39/1623 | 210/489 |
| 8,173,013 B2* | 5/2012 | Sato | F02M 37/10 | 210/489 |
| 8,186,396 B2* | 5/2012 | Piland | F02M 37/0076 | 137/313 |
| 8,192,622 B2* | 6/2012 | Kozey | E03B 3/04 | 210/462 |
| 8,221,620 B2* | 7/2012 | Dietrich | E04H 4/1636 | 210/232 |
| 8,246,819 B2* | 8/2012 | Sakata | B01D 35/0273 | 219/121.64 |
| 8,282,836 B2* | 10/2012 | Feher | E02B 9/04 | 210/162 |
| 8,292,089 B2* | 10/2012 | Osborne | B01D 29/114 | 210/172.3 |
| 8,297,448 B2* | 10/2012 | Watson | E02B 5/08 | 210/172.3 |
| 8,372,278 B1* | 2/2013 | Nguyen | B01D 35/0273 | 123/198 C |
| 8,453,622 B2* | 6/2013 | Iwaoka | F02M 37/0017 | 137/565.29 |
| 8,460,542 B2* | 6/2013 | Oku | F02M 37/50 | 210/457 |
| 8,475,659 B2* | 7/2013 | Oh | B01D 35/303 | 210/167.01 |
| 8,496,812 B2* | 7/2013 | Beer | F01M 11/0004 | 210/172.3 |
| 8,505,154 B2* | 8/2013 | Schuler | B01D 35/02 | 15/301 |
| 8,524,091 B2* | 9/2013 | Rocheux | B01D 39/1623 | 210/774 |
| 8,550,568 B2* | 10/2013 | Incoronato | E02F 7/005 | 299/8 |
| 8,641,892 B2* | 2/2014 | Winther | B01D 35/1573 | 210/429 |
| 8,652,324 B2* | 2/2014 | Wietharn | B01D 33/50 | 210/402 |
| 8,663,469 B2* | 3/2014 | Kim | B01D 29/031 | 210/167.01 |
| 8,673,141 B2* | 3/2014 | Stausberg | B01D 29/66 | 210/337 |

(56) References Cited

U.S. PATENT DOCUMENTS

| | | | | |
|---|---|---|---|---|
| 8,679,335 B1* | 3/2014 | Dufort | | B01D 29/6438 |
| | | | | 210/791 |
| 8,715,497 B2* | 5/2014 | Schnipke | | B01D 35/0273 |
| | | | | 210/172.3 |
| 8,728,308 B2* | 5/2014 | Schnipke | | B01D 35/0273 |
| | | | | 210/172.3 |
| 8,764,977 B2* | 7/2014 | Frerichs | | F16H 57/0404 |
| | | | | 210/172.3 |
| 8,771,509 B2* | 7/2014 | Huang | | C02F 11/00 |
| | | | | 210/324 |
| 8,784,656 B2* | 7/2014 | Wehner | | B01D 35/027 |
| | | | | 210/232 |
| 8,800,496 B1* | 8/2014 | Roche | | A01K 63/045 |
| | | | | 119/260 |
| 8,834,713 B1* | 9/2014 | Merrett | | B01D 35/153 |
| | | | | 210/123 |
| 8,876,491 B2* | 11/2014 | Palecek | | F04D 29/708 |
| | | | | 417/423.9 |
| 8,877,054 B2* | 11/2014 | Andersen | | B01D 35/303 |
| | | | | 210/232 |
| 9,023,198 B2* | 5/2015 | Wietharn | | B01D 33/801 |
| | | | | 210/402 |
| 9,051,701 B2* | 6/2015 | Westcott | | E02B 8/00 |
| 9,108,127 B2* | 8/2015 | Schuler | | B01D 29/46 |
| 9,212,068 B2* | 12/2015 | Mock | | B01D 63/00 |
| 9,255,372 B2* | 2/2016 | Whitaker | | B01D 35/02 |
| 9,272,170 B2* | 3/2016 | Hubbell, Jr. | | A62C 29/00 |
| 9,273,439 B1* | 3/2016 | Perkins | | E02B 5/085 |
| 9,273,658 B2* | 3/2016 | Kinnen | | F02M 37/007 |
| 9,279,225 B1* | 3/2016 | Prokupek | | B01D 21/2444 |
| 9,399,858 B2* | 7/2016 | Maxson | | B01D 39/10 |
| 9,403,108 B2* | 8/2016 | Broussard | | B01D 29/68 |
| 9,416,920 B2* | 8/2016 | Veinbergs | | F17D 1/08 |
| 9,429,250 B2* | 8/2016 | Lewis | | A62C 33/04 |
| 9,441,586 B2* | 9/2016 | Akagi | | F02M 37/103 |
| 9,500,283 B1* | 11/2016 | Price | | F16K 31/465 |
| 9,567,955 B2* | 2/2017 | Akagi | | F02M 37/44 |
| 9,573,085 B2* | 2/2017 | Beer | | F01M 11/0004 |
| 9,574,337 B1* | 2/2017 | Lang | | B01D 21/0012 |
| 9,593,676 B2* | 3/2017 | Vanconett | | F04B 53/16 |
| 9,604,164 B2* | 3/2017 | Smith | | B01D 29/48 |
| 9,816,470 B2* | 11/2017 | Nishio | | F02M 37/46 |
| 9,828,721 B2 | 11/2017 | Silverman et al. | | |
| 9,883,660 B2 | 2/2018 | Naess | | |
| 9,889,395 B2* | 2/2018 | Reber | | F04F 5/10 |
| 9,930,881 B2 | 4/2018 | Mefford | | |
| 9,943,786 B2* | 4/2018 | Ekholm | | B01D 35/18 |
| 9,957,931 B2* | 5/2018 | Kobayashi | | F02M 37/0088 |
| 9,962,740 B2* | 5/2018 | Thaler | | C02F 1/004 |
| 9,968,872 B2* | 5/2018 | Carayon | | B01D 33/073 |
| 9,982,449 B1* | 5/2018 | Kennedy | | E04H 4/1245 |
| 10,060,558 B2* | 8/2018 | Brink | | B01D 29/114 |
| 10,070,629 B2* | 9/2018 | Roche | | A01K 63/04 |
| 10,124,279 B2* | 11/2018 | Schuler | | B01D 29/46 |
| 10,145,341 B2* | 12/2018 | Kim | | F02M 37/14 |
| D838,807 S * | 1/2019 | Bauermann | | D23/206 |
| 10,167,651 B2* | 1/2019 | Jackson | | E04H 4/1681 |
| 10,214,871 B2* | 2/2019 | Ekholm | | B01D 35/1576 |
| 10,227,745 B2* | 3/2019 | Sifuentes Sanchez | ... | E02B 9/04 |
| 10,233,880 B2* | 3/2019 | Riehmann | | B01D 29/11 |
| 10,267,276 B2* | 4/2019 | Nishio | | B01D 29/90 |
| 10,272,367 B2* | 4/2019 | Inui | | B01D 24/12 |
| 10,391,429 B2* | 8/2019 | Carayon | | B01D 33/503 |
| 10,399,013 B2* | 9/2019 | Maxson | | B01D 39/10 |
| 10,436,161 B2* | 10/2019 | Kim | | F02M 37/50 |
| 10,456,720 B2* | 10/2019 | Smith | | B01D 29/33 |
| 10,470,443 B2* | 11/2019 | Lindner | | F04D 7/045 |
| 10,526,224 B2* | 1/2020 | Wallace | | C02F 9/00 |
| 10,549,224 B2* | 2/2020 | Carayon | | B01D 33/503 |
| 10,633,260 B2* | 4/2020 | Cornish | | B01D 29/35 |
| 10,729,995 B2* | 8/2020 | Reber | | F04F 5/10 |
| 10,737,950 B2* | 8/2020 | Bennett | | C02F 1/004 |
| 10,753,329 B2* | 8/2020 | Hayashi | | B01D 29/13 |
| 10,794,343 B2* | 10/2020 | Hayashi | | B01D 29/27 |
| 10,801,189 B2* | 10/2020 | Watson | | E02B 5/08 |
| 10,967,311 B1* | 4/2021 | Unruh | | E03B 3/04 |
| 11,035,113 B2* | 6/2021 | Eftekharzadeh | | E03F 5/106 |
| 11,066,798 B2* | 7/2021 | Paczek | | E02B 5/085 |
| 11,073,118 B2* | 7/2021 | Ito | | F02M 37/50 |
| 11,110,377 B1* | 9/2021 | Breti | | E03B 3/04 |
| 11,168,655 B2* | 11/2021 | Niwa | | F16K 17/12 |
| 11,192,068 B2* | 12/2021 | Ekholm | | B01D 65/02 |
| 11,202,977 B2* | 12/2021 | Monaghan | | F16L 55/24 |
| 11,203,854 B1* | 12/2021 | Eggleton | | E02B 9/04 |
| 11,207,615 B2* | 12/2021 | Hair | | F04D 29/4293 |
| 11,291,936 B2* | 4/2022 | Kim | | F02M 37/44 |
| 11,304,411 B2* | 4/2022 | Senecal | | A01K 63/045 |
| 11,311,825 B2* | 4/2022 | Hess | | E04H 4/1209 |
| 11,311,826 B2* | 4/2022 | Mehaffey | | F16L 9/22 |
| 11,331,603 B2* | 5/2022 | Maxson | | E02B 5/08 |
| 11,428,219 B2* | 8/2022 | Hofer | | B01D 29/33 |
| 11,484,818 B2* | 11/2022 | De Los Reyes, III | | B01D 29/114 |
| 11,536,289 B1* | 12/2022 | Spargo | | F04D 29/528 |
| 11,584,661 B2* | 2/2023 | Liberman | | A01K 79/02 |
| 11,628,387 B2* | 4/2023 | Garner | | B01D 35/0273 |
| | | | | 62/50.6 |
| 11,649,179 B2* | 5/2023 | Grimes | | C02F 1/444 |
| | | | | 210/170.11 |
| 11,679,346 B2* | 6/2023 | Hair | | B01D 21/2444 |
| | | | | 210/122 |
| 11,708,842 B2* | 7/2023 | Parmar | | A62C 99/0009 |
| | | | | 169/46 |
| 11,719,238 B2* | 8/2023 | Hofer | | B01D 33/801 |
| | | | | 210/297 |
| 11,795,067 B2* | 10/2023 | Liberman | | B01D 24/12 |
| 11,825,974 B1* | 11/2023 | Murphy | | A47J 19/005 |
| 11,832,606 B1* | 12/2023 | Brubacher | | A01M 1/2094 |
| 11,873,612 B2* | 1/2024 | Ekholm | | B01D 29/54 |
| 11,898,529 B2* | 2/2024 | Fasseland | | B01D 29/445 |
| D1,022,120 S * | 4/2024 | Fox | | D23/209 |
| 12,071,997 B2* | 8/2024 | LaCrosse | | E03B 7/09 |
| 12,083,453 B2* | 9/2024 | Powell | | B01D 29/603 |
| 2001/0023846 A1* | 9/2001 | Spriegel | | B01D 29/15 |
| | | | | 210/460 |
| 2001/0032810 A1* | 10/2001 | Wilkins | | B01D 29/05 |
| | | | | 210/411 |
| 2002/0017485 A1* | 2/2002 | Ito | | F02M 37/50 |
| | | | | 210/508 |
| 2002/0020678 A1* | 2/2002 | Loreno | | B01D 35/027 |
| | | | | 210/767 |
| 2002/0023418 A1* | 2/2002 | Kojima | | B01D 35/0273 |
| | | | | 55/379 |
| 2002/0079265 A1* | 6/2002 | Ito | | B01D 35/0273 |
| | | | | 210/416.4 |
| 2002/0127060 A1* | 9/2002 | Bryan | | E02B 9/04 |
| | | | | 119/219 |
| 2002/0148766 A1* | 10/2002 | Dwyer | | G21C 19/307 |
| | | | | 210/315 |
| 2003/0010691 A1* | 1/2003 | Broussard | | B01D 24/08 |
| | | | | 210/243 |
| 2003/0029780 A1* | 2/2003 | Ekholm | | B01D 29/114 |
| | | | | 210/162 |
| 2003/0034286 A1* | 2/2003 | Butler | | E03F 5/0404 |
| | | | | 210/163 |
| 2003/0042185 A1* | 3/2003 | Dockery | | B01D 35/147 |
| | | | | 210/416.4 |
| 2003/0057149 A1* | 3/2003 | Iwamoto | | F02M 37/50 |
| | | | | 156/308.2 |
| 2003/0127385 A1* | 7/2003 | Spriegel | | B01D 29/15 |
| | | | | 210/484 |
| 2003/0164342 A1* | 9/2003 | Mason | | B01D 29/114 |
| | | | | 210/323.2 |
| 2003/0198516 A1* | 10/2003 | Bryan | | E02B 1/006 |
| | | | | 405/81 |
| 2004/0007518 A1* | 1/2004 | Natale | | B01D 35/02 |
| | | | | 210/488 |
| 2004/0045884 A1* | 3/2004 | Roth | | B01D 35/0273 |
| | | | | 210/416.4 |
| 2004/0057839 A1* | 3/2004 | Crawford, III | | F04F 5/54 |
| | | | | 417/87 |

(56) References Cited

U.S. PATENT DOCUMENTS

| | | | |
|---|---|---|---|
| 2004/0094470 A1* | 5/2004 | Jackson | B01D 29/114 210/411 |
| 2004/0112846 A1* | 6/2004 | Jackson | A01K 63/045 210/798 |
| 2004/0124127 A1* | 7/2004 | Fox | B01D 29/15 210/489 |
| 2004/0164031 A1* | 8/2004 | Reber | B01D 35/02 210/767 |
| 2004/0168971 A1* | 9/2004 | Sato | B01D 35/0273 210/490 |
| 2004/0237485 A1* | 12/2004 | Beer | F16H 57/0402 55/385.3 |
| 2004/0251194 A1* | 12/2004 | Brzozowski | B01D 35/0273 210/416.4 |
| 2005/0006300 A1* | 1/2005 | Sato | F02M 37/34 210/416.4 |
| 2005/0023201 A1* | 2/2005 | Sato | B01D 35/0273 210/488 |
| 2005/0029173 A1* | 2/2005 | Kimisawa | B01D 35/027 210/136 |
| 2005/0150826 A1* | 7/2005 | Sato | B01D 35/0273 210/488 |
| 2005/0161380 A1* | 7/2005 | Crawford, III | F04F 5/10 210/170.09 |
| 2006/0076287 A1* | 4/2006 | Catlin | F02M 37/025 210/416.4 |
| 2006/0266701 A1* | 11/2006 | Dickerson | B01D 39/1623 210/490 |
| 2006/0289346 A1* | 12/2006 | Kiefer | B01D 35/02 210/167.1 |
| 2007/0017549 A1* | 1/2007 | Ekholm | B01D 35/02 134/109 |
| 2007/0084782 A1* | 4/2007 | Smith | B01D 29/15 210/323.2 |
| 2007/0095733 A1* | 5/2007 | Pizzo | B01D 35/0273 210/416.4 |
| 2007/0108112 A1* | 5/2007 | Jones | E03B 3/00 210/170.11 |
| 2007/0175834 A1* | 8/2007 | Osborne | B01D 35/02 210/162 |
| 2007/0199884 A1* | 8/2007 | Nakagawa | F02M 37/50 210/416.4 |
| 2007/0227956 A1* | 10/2007 | Wietham | B01D 33/50 210/403 |
| 2007/0246420 A1* | 10/2007 | Sato | B01D 35/0273 210/416.4 |
| 2007/0267340 A1* | 11/2007 | Bleigh | B01D 29/15 210/486 |
| 2008/0000527 A1* | 1/2008 | Ranstead | E03F 5/103 137/398 |
| 2008/0061010 A1* | 3/2008 | Tom | A01K 63/045 210/167.01 |
| 2008/0101867 A1* | 5/2008 | McLaughlin | E02B 8/08 405/83 |
| 2008/0185331 A1* | 8/2008 | Sato | F02M 37/24 210/435 |
| 2008/0290013 A1* | 11/2008 | Stausberg | B01D 29/54 210/167.04 |
| 2008/0295758 A1* | 12/2008 | Glessner | C02F 1/004 62/240 |
| 2009/0039011 A1* | 2/2009 | Sato | B01D 35/0273 210/491 |
| 2009/0050551 A1* | 2/2009 | Kimisawa | F02M 37/025 210/172.4 |
| 2009/0178974 A1* | 7/2009 | Leonardich | B08B 9/032 210/651 |
| 2009/0184064 A1* | 7/2009 | Zaiter | B01D 29/54 210/170.01 |
| 2009/0230042 A1* | 9/2009 | Broussard | C02F 1/004 210/275 |
| 2009/0250410 A1* | 10/2009 | Khalil | B01D 29/56 210/295 |
| 2009/0301954 A1* | 12/2009 | Beer | F01M 11/0004 210/167.08 |
| 2010/0025315 A1* | 2/2010 | Smith | B01D 29/15 210/232 |
| 2010/0038296 A1* | 2/2010 | Beer | F01M 11/0004 210/167.03 |
| 2010/0059432 A1* | 3/2010 | Kozey | B01D 35/153 210/242.1 |
| 2010/0065508 A1* | 3/2010 | Bolan | E03B 7/00 210/162 |
| 2010/0072120 A1* | 3/2010 | Sato | B01D 39/1623 210/172.4 |
| 2010/0206802 A1* | 8/2010 | Sato | B01D 39/083 210/490 |
| 2010/0243547 A1* | 9/2010 | Justice | E03B 3/32 210/170.09 |
| 2011/0017668 A1* | 1/2011 | Mock | C02F 1/002 210/232 |
| 2011/0056526 A1* | 3/2011 | Ekholm | B01D 35/02 134/37 |
| 2011/0084008 A1* | 4/2011 | Kielbowicz | B01D 35/1475 210/315 |
| 2011/0132825 A1* | 6/2011 | Nishio | F02M 37/44 210/172.4 |
| 2011/0146802 A1* | 6/2011 | Feher | E02B 5/08 137/544 |
| 2011/0155658 A1* | 6/2011 | Graber | F02M 37/34 210/243 |
| 2011/0174703 A1* | 7/2011 | Bolan | B01D 35/05 210/136 |
| 2011/0180469 A1* | 7/2011 | Sato | F02M 37/50 210/172.4 |
| 2011/0192786 A1* | 8/2011 | Nagai | F02M 37/50 210/443 |
| 2011/0215059 A1* | 9/2011 | Smith | B01D 29/58 210/232 |
| 2011/0233132 A1* | 9/2011 | Wietharn | B01D 33/50 210/403 |
| 2011/0240543 A1* | 10/2011 | Kozey | B01D 29/33 210/232 |
| 2011/0247970 A1* | 10/2011 | Evingham | B01D 29/52 210/85 |
| 2011/0278235 A1* | 11/2011 | Blumenthal | E03B 3/04 210/170.11 |
| 2011/0284442 A1* | 11/2011 | Williams | B01D 29/58 210/170.09 |
| 2011/0290743 A1* | 12/2011 | Osborne | B01D 35/02 210/335 |
| 2011/0297595 A1* | 12/2011 | Wallace | E02B 1/006 210/155 |
| 2012/0018369 A1* | 1/2012 | Markgraf | B01D 29/48 210/435 |
| 2012/0020734 A1* | 1/2012 | Ross | E03B 3/04 405/80 |
| 2012/0125828 A1* | 5/2012 | Watson | E02B 5/08 210/162 |
| 2012/0125829 A1* | 5/2012 | Wallace | E02B 9/04 210/170.11 |
| 2012/0138164 A1* | 6/2012 | Bolan | B01D 35/05 137/154 |
| 2012/0298572 A1* | 11/2012 | Ekholm | B01D 35/1576 210/340 |
| 2013/0001148 A1* | 1/2013 | Osborne | E02B 9/04 210/323.1 |
| 2013/0043172 A1* | 2/2013 | Watson | E03B 3/04 210/162 |
| 2013/0048551 A1* | 2/2013 | Maxson | E03B 3/04 210/323.2 |
| 2013/0061421 A1* | 3/2013 | Schuler | B01D 35/16 137/544 |
| 2013/0180904 A1* | 7/2013 | Broussard | C02F 1/004 210/232 |
| 2013/0206184 A1* | 8/2013 | Nair | B08B 3/024 134/172 |
| 2013/0206706 A1* | 8/2013 | Ekholm | B01D 29/68 210/97 |

(56) References Cited

U.S. PATENT DOCUMENTS

| | | | | |
|---|---|---|---|---|
| 2013/0240459 A1* | 9/2013 | Andrews | E03B 3/04 | 210/791 |
| 2013/0256236 A1* | 10/2013 | Huang | C02F 11/121 | 210/411 |
| 2014/0083516 A1* | 3/2014 | Veinbergs | F17D 1/08 | 137/15.01 |
| 2014/0083724 A1* | 3/2014 | Hubbell, Jr. | A62C 3/02 | 169/52 |
| 2014/0138300 A1* | 5/2014 | Wietharn | B01D 35/05 | 210/242.1 |
| 2014/0175014 A1* | 6/2014 | Mock | B01D 61/18 | 210/416.3 |
| 2014/0197091 A1* | 7/2014 | Andersen | B01D 35/303 | 210/323.2 |
| 2014/0224746 A1* | 8/2014 | Niizato | E03B 3/04 | 210/170.11 |
| 2014/0305880 A1* | 10/2014 | Roche | A01K 63/045 | 210/747.5 |
| 2014/0345719 A1* | 11/2014 | Kim | F02M 37/50 | 137/544 |
| 2014/0374340 A1* | 12/2014 | Whitaker | E02B 5/085 | 210/499 |
| 2015/0001166 A1* | 1/2015 | Ben-Horin | B01D 29/6438 | 210/791 |
| 2015/0014242 A1* | 1/2015 | Smith | B23K 31/02 | 228/178 |
| 2015/0021249 A1* | 1/2015 | Watson | E03B 3/04 | 210/153 |
| 2015/0122716 A1* | 5/2015 | Reber | A62C 33/00 | 417/151 |
| 2015/0258474 A1* | 9/2015 | Broussard | B01D 35/05 | 210/257.1 |
| 2015/0265952 A1* | 9/2015 | Berry, IV | B01D 33/461 | 210/396 |
| 2015/0306527 A1* | 10/2015 | Schuler | B01D 35/02 | 210/190 |
| 2017/0050129 A1* | 2/2017 | Kozey | B01D 35/05 | |
| 2017/0106313 A1* | 4/2017 | Maxson | B01D 29/111 | |
| 2017/0197161 A1* | 7/2017 | Smith | B01D 29/48 | |
| 2017/0234459 A1* | 8/2017 | Brink | B01D 29/15 | 137/15.09 |
| 2018/0001123 A1* | 1/2018 | Younker | F16H 9/16 | |
| 2018/0116188 A1* | 5/2018 | Lindner | B01D 33/155 | |
| 2018/0209386 A1* | 7/2018 | Hayashi | B01D 35/02 | |
| 2018/0298576 A1* | 10/2018 | Sifuentes Sanchez | E03B 3/04 | |
| 2019/0062178 A1* | 2/2019 | Bennett | B01D 29/902 | |
| 2019/0263677 A1* | 8/2019 | Liberman | B01D 24/4636 | |
| 2019/0390428 A1* | 12/2019 | Ekholm | B01D 35/1576 | |
| 2020/0095135 A1* | 3/2020 | Cornish | C02F 1/001 | |
| 2020/0114289 A1* | 4/2020 | Garner | B01D 35/0273 | |
| 2020/0122062 A1* | 4/2020 | Maxson | B01D 35/02 | |
| 2020/0325894 A1* | 10/2020 | Hofer | B01D 29/33 | |
| 2020/0330905 A1* | 10/2020 | Dam | B01D 29/56 | |
| 2020/0392687 A1* | 12/2020 | Paczek | E02B 8/06 | |
| 2020/0398226 A1* | 12/2020 | Ekholm | E02B 1/003 | |
| 2021/0002146 A1* | 1/2021 | Liberman | B01D 61/026 | |
| 2021/0015080 A1* | 1/2021 | Senecal | F04F 10/00 | |
| 2021/0023479 A1* | 1/2021 | Lee | B01D 35/30 | |
| 2021/0187416 A1* | 6/2021 | Ekholm | B01D 29/48 | |
| 2021/0363958 A1* | 11/2021 | Fasseland | B01D 29/445 | |
| 2022/0105474 A1* | 4/2022 | Ekholm | B01D 29/54 | |
| 2022/0315451 A1* | 10/2022 | Liberman | C02F 1/38 | |
| 2022/0333595 A1* | 10/2022 | Hofer | B01D 35/26 | |
| 2023/0024886 A1* | 1/2023 | Wu | E02B 1/006 | |
| 2023/0069293 A1* | 3/2023 | Liberman | A01K 79/02 | |
| 2023/0103787 A1* | 4/2023 | Ekholm | B01D 29/19 | 210/348 |
| 2023/0226467 A1* | 7/2023 | Lee | B01D 24/004 | 210/264 |

OTHER PUBLICATIONS

Department of Fisheries and Oceans, Freshwater Intake End-of-Pipe Fish Screen Guideline, Department of Fisheries and Oceans, p. 13, Fig. 5, 1995.

"Gauze Net Filter Pump Protect Hose Mesh Micro Irrigation Water Clean Screen"; printed on Jul. 6, 2022 from https://www.walmart.com/ip/Gauze-Net-Filter-Pump-Protect-Hose-Mesh-Micro-Irrigation-Water-Clean-Screen/699611076?athbdg=L1700.

"Fish Tank Filter Mesh Water Pump Hose Net Clean Screen Pumps Aquarium Supplies"; printed on Jul. 6, 2022 from https://www.walmart.com/ip/Fish-Tank-Filter-Mesh-Water-Pump-Hose-Net-Clean-Screen-Pumps-Aquarium-Supplies/618118826?wmlspartner=wlpa&selectedSellerId=101129668.

* cited by examiner

SUBMERGED LIQUID INTAKE STRAINERS

CROSS-REFERENCE TO RELATED APPLICATION

This application claims the benefit of U.S. Provisional Patent Application No. 63/221,528, filed on Jul. 14, 2021.

GOVERNMENT LICENSE RIGHTS

This invention was made with government support under cooperative research and development agreement number 21-RD-1113810-029 awarded by the USDA Forest Service. The government has certain rights in the invention.

BACKGROUND

1. Field

The disclosure of the present patent application relates to filtration for suction pipes, hoses and the like, and particularly to a screen for protecting fish from being drawn into, or coming in close contact with, a strainer attached to the end of a suction pipe, hose or the like.

2. Description of the Related Art

Suction strainers are widely used for a variety of different pump and suction-based applications. For example, when a fire hydrant is not available to firefighters, they may engage in water "drafting" from a nearby pond, lake or other body of water. Drafting is performed by attaching a hose to a pump, where one end of the hose is placed in the nearby body of water and the pump pressurizes the water for either direct use for firefighting or for storage in a tank. To prevent large fish, sticks, debris, pollution and the like from being sucked into the hose during the drafting operation, a suction strainer is applied to the end of the hose which is submerged in the water.

FIG. 2 shows a typical prior art suction strainer 100 which is attached to the inlet I of a suction hose H. Suction strainer 100 is a conventional "barrel" strainer, which is in the form of a cylindrical screen for filtering and screening the water as it is sucked through inlet I. Although barrel strainers, such as strainer 100 are common, suction strainers have a wide variety of different shapes and configurations, typically dependent upon the particular application.

Although typical suction strainers are effective at preventing the intake of a wide variety of fish and debris, they are typically provided with screen sizes which still allow small fish through, such as juvenile salmonids, for example, as well as small contaminants, such as sediment and the like. Thus, an additional fish screen with a smaller mesh size may be applied to cover the suction strainer. As shown in FIG. 3A, a conventional fish screen 200 may include a pair of circular plates 202, 204 connected by a helical spring 208, which has a constant diameter. Plate 202 has a central opening 206 for receiving the suction strainer. The plates 202, 204 and the helical spring 208 are covered by a mesh bag 210, which may be secured with a drawstring 212, a strap or the like.

As shown in FIG. 3B, in use, the suction strainer 100 is attached to the hose H and the suction strainer 100 is inserted inside helical spring 208 through opening 206 in plate 202. The mesh bag 210 covers the plates 202, 204, the helical spring 208 and the suction strainer 100. The mesh bag 210 is held in place by tightening drawstring 212, a strap or the like about hose H.

As shown in FIG. 3B, the diameters of the helical spring 208 and the mesh bag 210 are relatively large when compared against the diameter of the hose H and the suction strainer 100. This is because larger fish strainers have been found to cause less stress to the fish. For a fish screen that is sized to fit snugly over the suction strainer, any fish that contacts or is adjacent to the screen will feel the full force of suction at the inlet of the hose. By increasing the radius around the inlet, the suction force is decreased, thus putting less stress on the fish. However, as can be seen in FIG. 3B, by increasing the size of the fish screen, the suction strainer 100 is provided with a relatively large amount of room in which to move freely. This makes the suction strainer 100 susceptible to damage and being dislodged from the fish screen. Thus, a fish screen for a suction strainer solving the aforementioned problems is desired.

SUMMARY

A fish screen for a suction strainer is a screen for protecting fish from being drawn into, or coming in close contact with, a strainer attached to the end of a suction pipe, hose or the like. The present fish screen for a suction strainer includes at least one first plate having a central opening formed therethrough, a second plate, a helical spring, and a mesh bag. The helical spring has opposed first and second ends, with the first end secured to the at least one first plate and the second end secured to the second plate. The at least one first plate is spaced apart from the second plate with the helical spring extending therebetween. As a non-limiting example, each of the at least one first plate and the second plate may have a circular contour. The helical spring has first and second portions positioned respectively adjacent to the first and second ends. The second portion of the helical spring has a smaller diameter than a diameter of the first portion of the helical spring.

The mesh bag releasably and removably covers and receives the at least one first plate, the second plate and the helical spring. The second portion of the helical spring is sized and shaped for releasably holding at least a free end of a suction strainer received within an interior of the helical spring through the central opening of the at least one first plate. The mesh bag may have a strap, a drawstring or the like for releasably sealing an opening of the mesh bag about a hose attached to the suction strainer.

In one embodiment, the first portion of the helical spring has a constant first diameter and the second portion of the helical spring has a constant second diameter. It should be understood that a variety of different helical springs may be manufactured such that the second diameter of the second portion is appropriately sized for securely receiving a particular size and/or style of suction strainer. Similarly, it should be understood that the at least one first plate, the second plate, the helical spring and the mesh bag may each be manufactured in a variety of different sizes and shapes, dependent upon the particular size and style of the suction strainer being used.

In an alternative embodiment, the helical spring has a tapered contour, such that the diameter of the helical spring at its first end is at a maximum, and the diameter at its second end is at a minimum, with the smaller diameter second portion again being sized to releasably receive at least the free end of the suction strainer.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
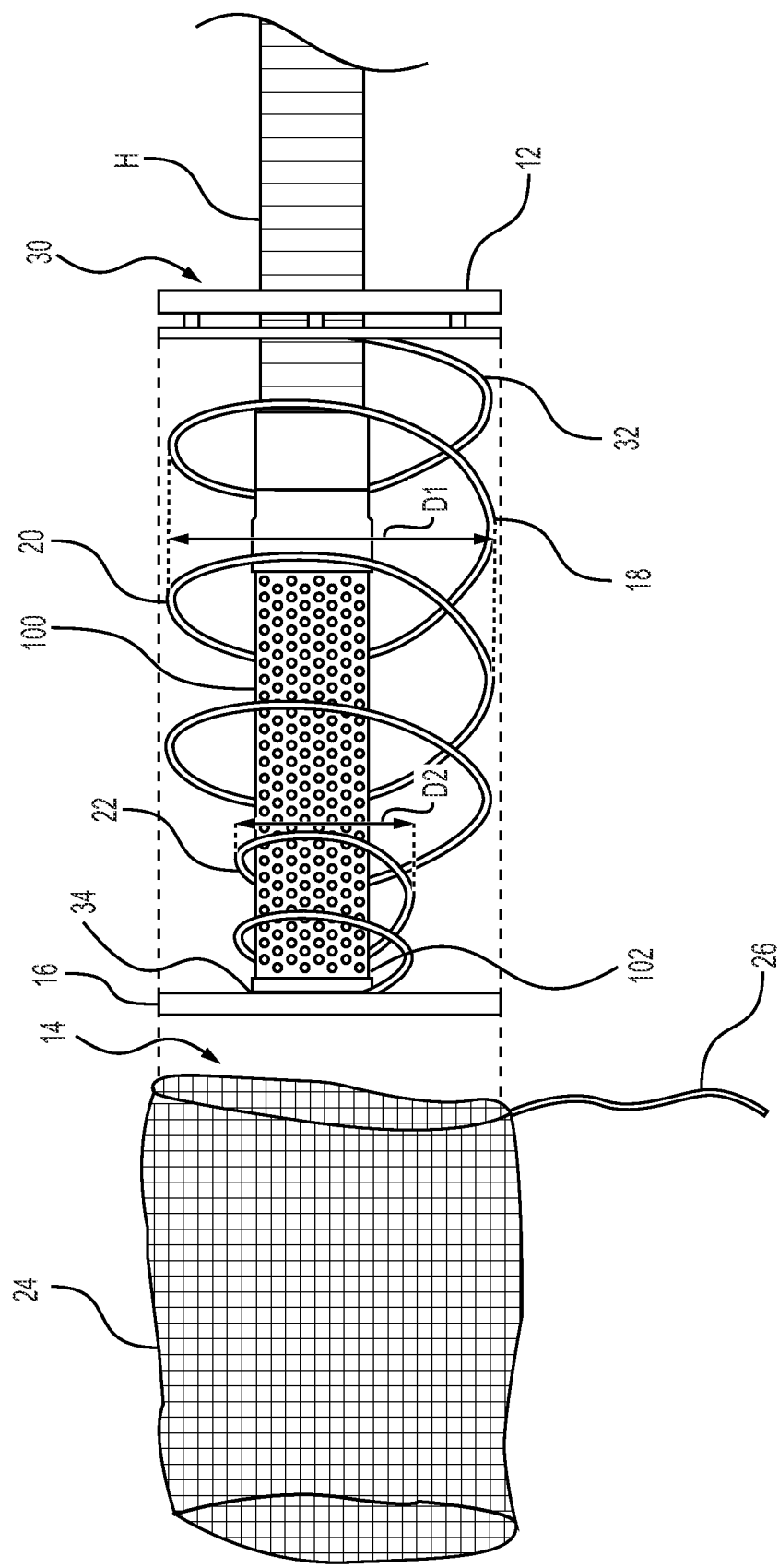
FIG. 1A is a partially-exploded side view of a fish screen for a suction strainer.
Figure 1B:
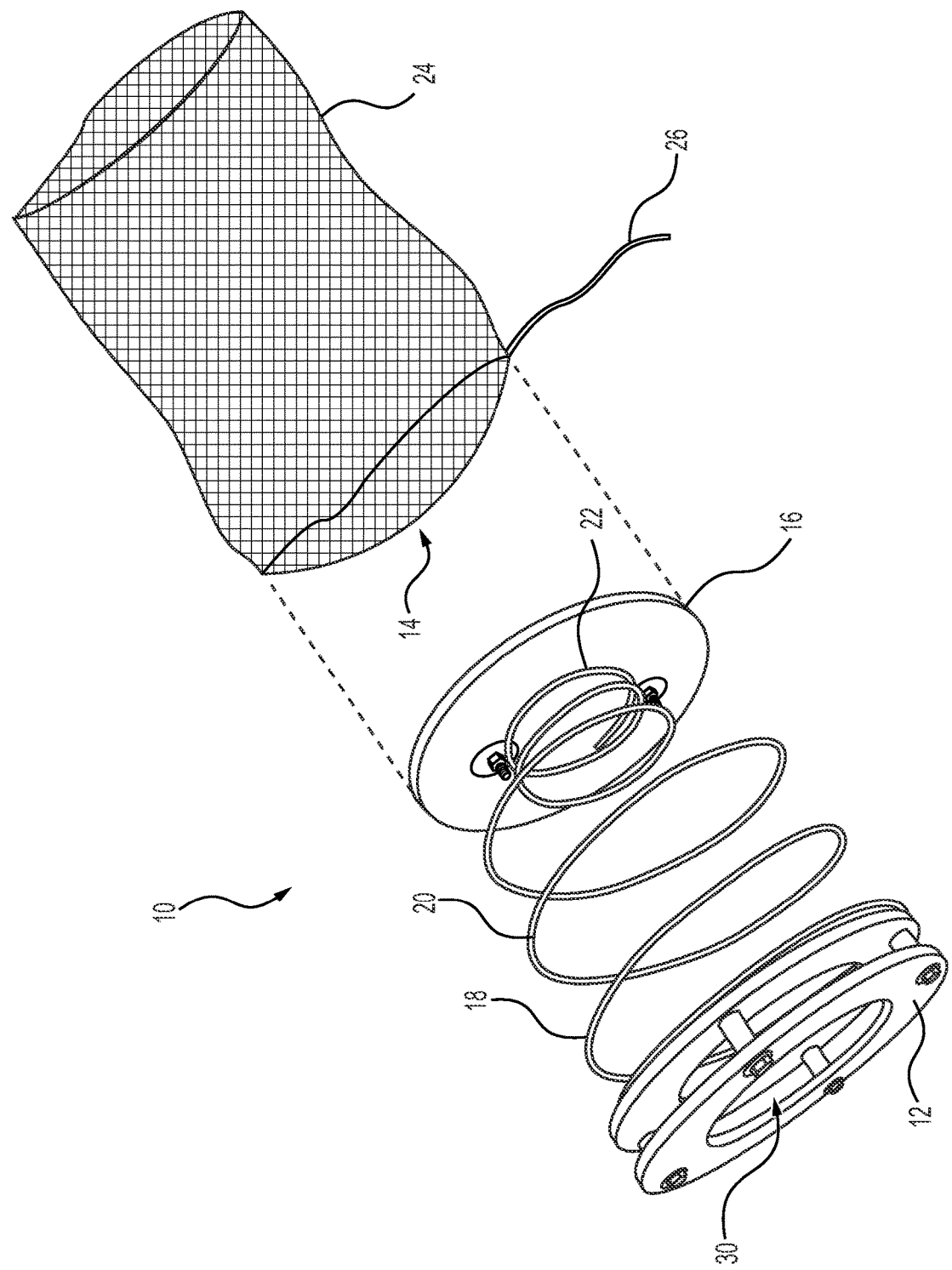
FIG. 1B is a partially-exploded perspective view of the fish screen for a suction strainer of FIG. 1A.
Figure 2:
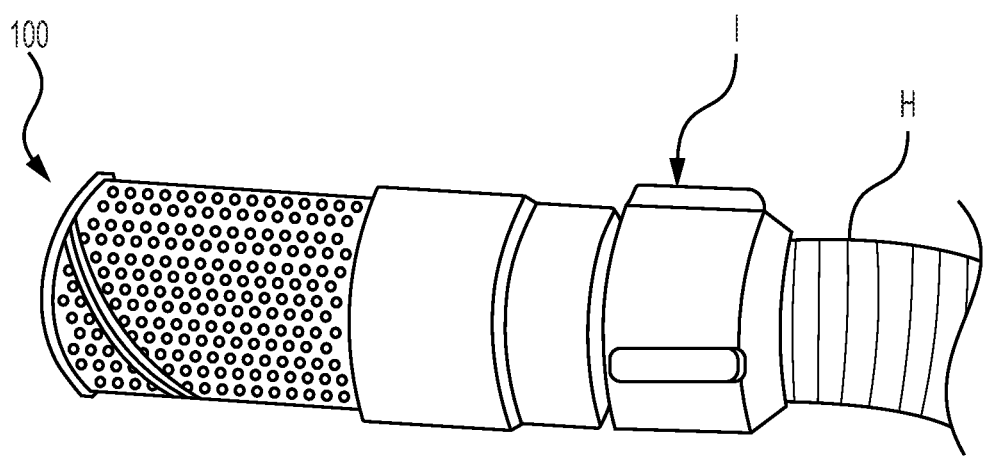
FIG. 2 shows a typical prior art suction strainer.
Figure 3A:
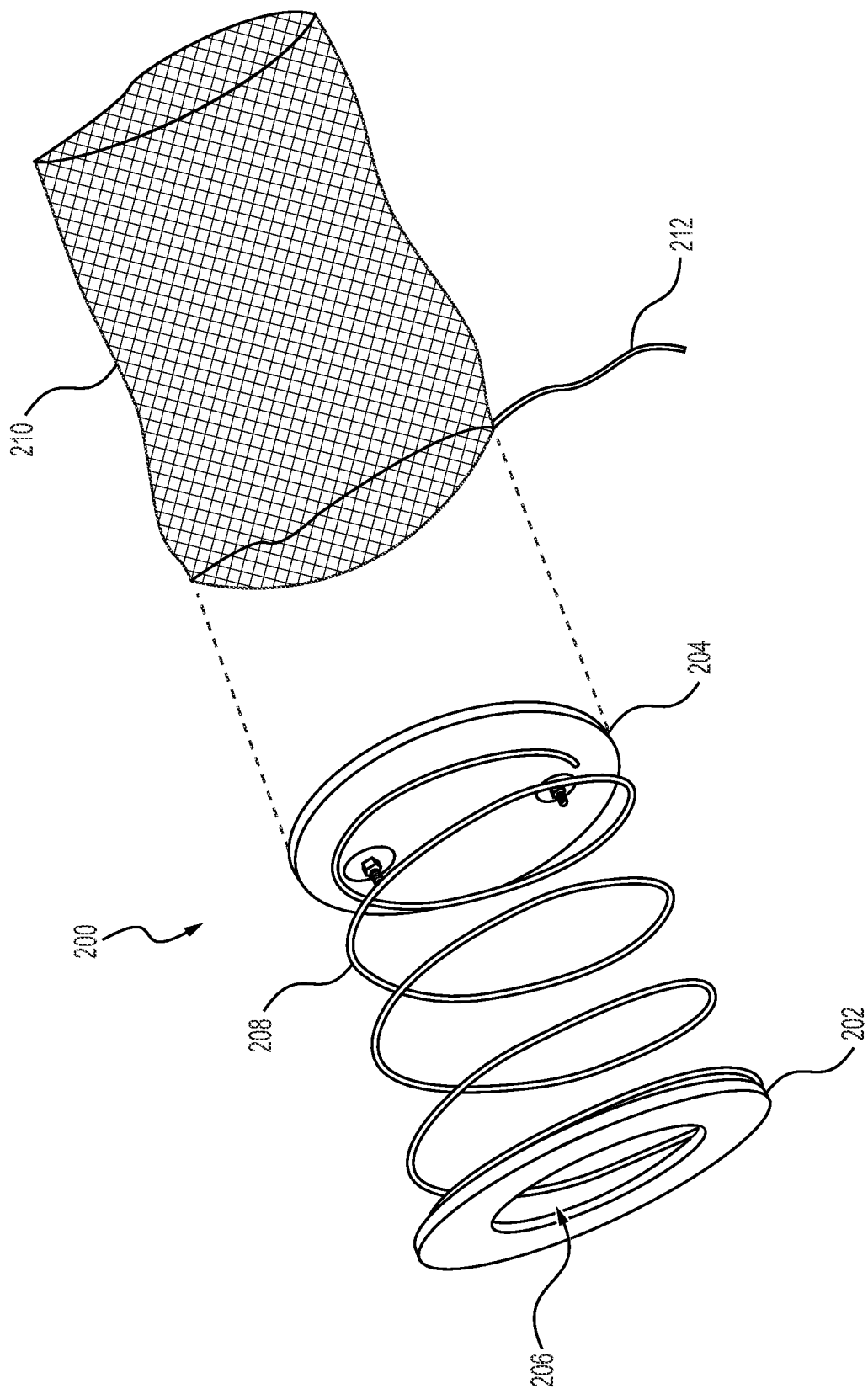
FIG. 3A is a partially-exploded perspective view of a conventional prior art fish screen for use with the suction strainer of FIG. 2.
Figure 3B:
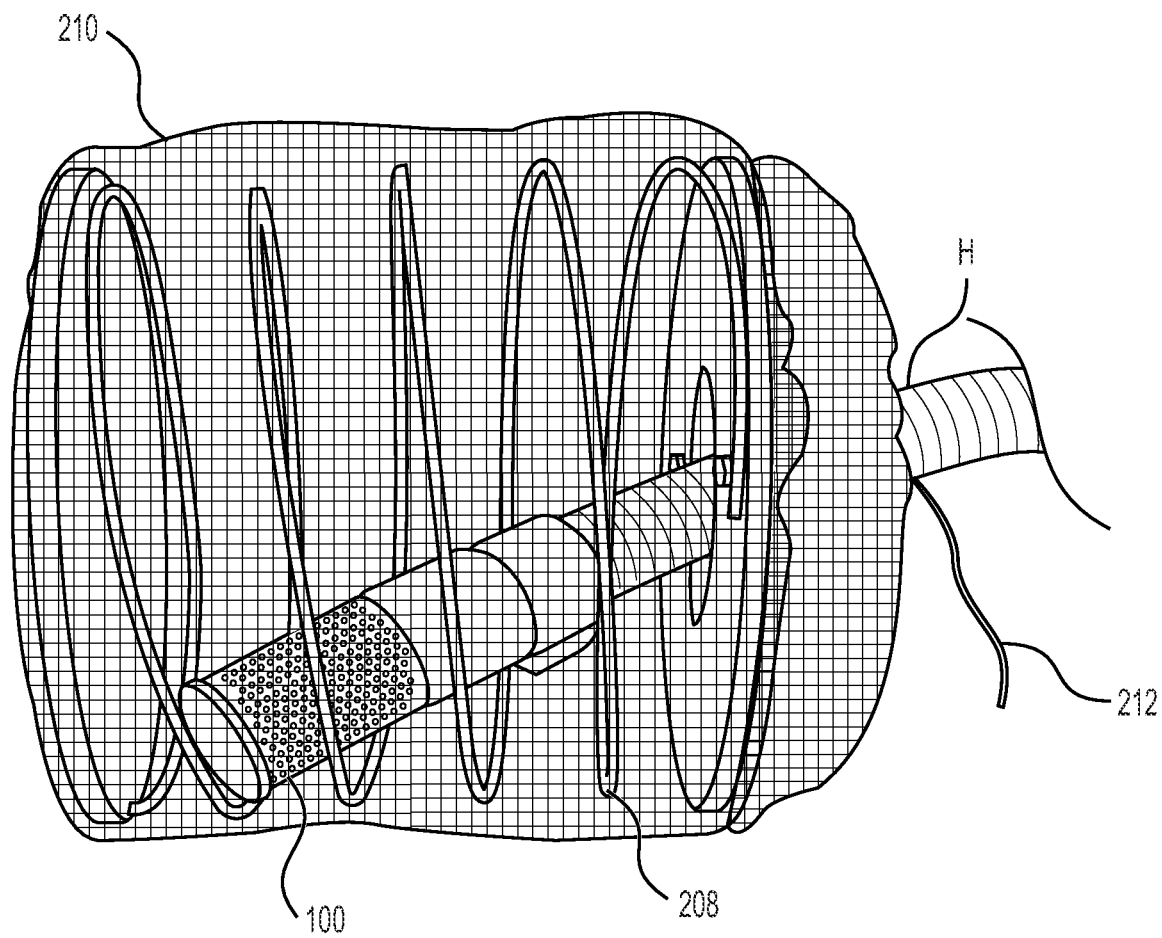
FIG. 3B is a perspective view of the prior art fish screen of FIG. 3A attached to the suction strainer of FIG. 2.

The present fish screen for a suction strainer 10 is a screen for protecting fish from being drawn into, or coming in close contact with, a strainer attached to the end of a suction pipe, hose, or the like. As shown in FIGS. 1A and 1B, the fish screen for a suction strainer 10 includes at least one first plate 12 having a central opening 30 formed therethrough, a second plate 16, a helical spring 18, and a mesh bag 24. In the non-limiting example of FIGS. 1A and 1B, the at least one first plate 12 is shown as being formed from a pair of ring-shaped plates secured together. However, it should be understood that the at least one first plate 12 may be formed from any desired number of plates, including a single plate. It should also be understood that any of the one or more first plates 12 should have the central opening 30 formed through each plate. Additionally, in the non-limiting example of FIGS. 1A and 1B, each of the at least one first plate 12 and second plate 16 is shown as having a circular contour, with a circular central opening 30 formed through the at least one first plate 12. It should be understood that the at least one first plate 12, the second plate 16 and the central opening 30 may have any suitable contours, including but not limited to triangles, squares, rectangles, diamonds, and the like.

Further, it should be understood that the overall contouring, relative dimensions, and overall configuration of the at least one first plate 12, the second plate 16, the helical spring 18 and the mesh bag 24 are shown in FIGS. 1A and 1B for exemplary purposes only. It should also be understood that the at least one first plate 12 and the second plate 16 may be made from any suitable type of non-corrosive and non-toxic material, such as, by way of non-limiting example plastic, stainless steel or the like.

The helical spring 18 has opposed first and second ends 32, 34, respectively, with the first end 32 secured to the at least one first plate 12 and the second end 34 secured to the second plate 16. In the non-limiting example of FIG. 1B, the helical spring 18 is shown secured to the at least one first plate 12 and the second plate 16 by bolts, however, it should be understood that the helical spring 18 may be secured to the at least one first plate 12 and the second plate 16 by any suitable type of attachment. The at least one first plate 12 is spaced apart from the second plate 16, with the helical spring 18 extending therebetween. The helical spring 18 has first and second portions 20, 22, respectively, which are positioned respectively adjacent to the first and second ends 32, 34; i.e., the first portion 20 is closest to first end 32 and the at least one first plate 12, and the second portion 22 is closest to second end 34 and the second plate 16. As will be discussed in greater detail below, the second portion 22 of the helical spring 18 has a smaller diameter D2 than a diameter D1 of the first portion 20 of the helical spring 18.

The mesh bag 24 releasably and removably covers and receives the at least one first plate 12, the second plate 16 and the helical spring 18. As illustrated in FIG. 1A, the second portion 22 of the helical spring 18 is sized and shaped for releasably holding at least a free end 102 of a suction strainer 100 received within an interior of the helical spring 18 through the central opening 30 of the at least one first plate 12. As shown, the mesh bag 24 may have a drawstring 26 for releasably sealing an opening 14 of the mesh bag 24 about a hose H attached to the suction strainer 100. It should be understood that the drawstring 26 may be replaced by, or used in conjunction with, any suitable type of attachment for securing the mesh bag 24 and/or the at least one first plate 12, the second plate 16 and/or the helical spring 18 to the hose H and/or the suction strainer 100, such as, for example, a strap, a buckle, clips or the like. In one embodiment, such as the embodiments of FIGS. 1A and 1B, the second plate 16 is inserted in the mesh bag first, followed by the helical spring 18 and then the at least one first plate 12.

In the embodiment of FIGS. 1A and 1B, the first portion 20 of the helical spring 18 has a constant first diameter D1, and the second portion 22 of the helical spring 18 has a constant second diameter D2, with the constant second diameter D2 being smaller than the constant first diameter D1. It should be understood that a variety of different helical springs 18 may be manufactured such that the second diameter D2 of the second portion 22 is appropriately sized for securely receiving a particular size and/or style of suction strainer 100. In this regard, the smaller second diameter D2 of the second portion 22 should be only slightly larger than a diameter of the suction strainer 100 to ensure the suction strainer 100 remains relatively secure and does not have freedom of motion throughout the mesh bag 24. Likewise, the suction strainer 100 has a relatively small amount of room in which to move freely in the mesh bag 24. This reduces wear and tear on the mesh bag 24, as well as reducing the susceptibility of the suction strainer 100 to damage and being dislodged from the fish screen. Similarly, it should be understood that the at least one first plate 12, the second plate 16, the helical spring 18 and the mesh bag 24 may each be manufactured in a variety of different sizes and shapes, all while keeping the same relative configuration as described herein, dependent upon the particular size and style of the suction strainer 100 and/or hose H being used. It should be further understood that suction strainer 100 and hose H are shown in FIG. 1A for exemplary and illustrative purposes only.

Figure 4:
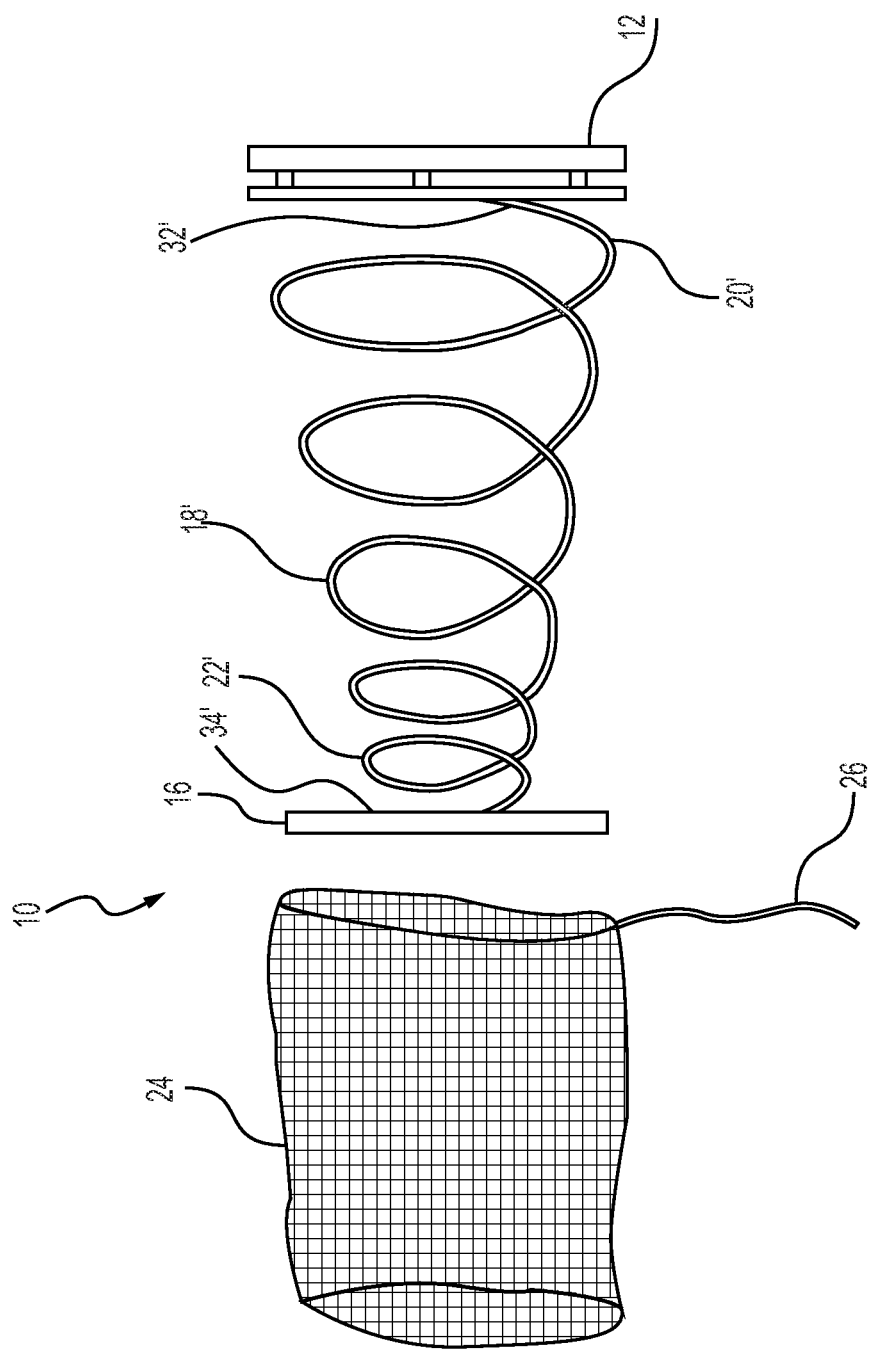
FIG. 4 is a partially-exploded side view of an alternative embodiment of the fish screen for a suction strainer of FIGS. 1A and 1B.

In the alternative embodiment of FIG. 4, helical spring 18 is replaced by helical spring 18', which has a tapered contour. In the embodiment of FIG. 4, the diameter of the helical spring 18' at its first end 32' is at a maximum, and the diameter at its second end 34' is at a minimum, with the smaller diameter second portion 22' again being sized to releasably receive at least the free end of the suction strainer. Because of the constantly tapered shape from first end 32' to second end 34', the second portion 22' will always have a smaller diameter than the first portion 20'.

It should be understood that mesh bag 24 may be made of any suitable type of mesh fabric or the like which has a porosity small enough such that small fish, debris, sediment and the like cannot pass therethrough, and which is also safe and non-toxic to marine life. Mesh bag 24 is preferably also formed from a material which is strong enough to resist damage and tearing from debris, pollutants, marine life and the like. When the fish screen for a suction strainer 10 is not in use, the mesh bag 24 may be removed, and the at least one first plate 12 and the second plate 16 may be compressed together (through compression of the helical spring 18) for storage. In one embodiment, the mesh bag 24 is sized to have a diameter just slightly larger than the diameter D1 of the at least one first plate 12. In other embodiments, the mesh bag 24 has a diameter much larger than the diameter D1 of the at least one first plate 12.

It is to be understood that the fish screen for a suction strainer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A fish screen for a suction strainer, comprising:
   at least one first plate having a central opening formed therethrough;
   a second plate;
   a helical spring having opposed first and second ends, the first end being secured to the at least one first plate and the second end being secured to the second plate, the helical spring having first and second portions positioned respectively adjacent to the first and second ends, and wherein the second portion of the helical spring has a smaller diameter than a diameter of the first portion of the helical spring; and
   a mesh bag for releasably covering and receiving the at least one first plate, the second plate and the helical spring,
   whereby the second portion of the helical spring is sized and shaped for releasably holding a free end of a suction strainer received within an interior of the helical spring through the central opening of the at least one first plate.

2. The fish screen for a suction strainer as recited in claim 1, wherein each of the at least one first plate and the second plate has a circular contour.

3. The fish screen for a suction strainer as recited in claim 1, wherein the first portion of the helical spring has a constant first diameter, and the second portion of the helical spring has a constant second diameter.

4. The fish screen for a suction strainer as recited in claim 1, wherein the helical spring has a tapered contour.

5. The fish screen for a suction strainer as recited in claim 1, wherein the mesh bag has a drawstring for releasably sealing an opening of the mesh bag about a hose attached to the suction strainer.

6. A fish screen for a suction strainer, comprising:
   at least one first plate having a central opening formed therethrough;
   a second plate;
   a helical spring having opposed first and second ends, the first end being secured to the at least one first plate and the second end being secured to the second plate, the helical spring having first and second portions positioned respectively adjacent to the first and second ends, wherein the first portion of the helical spring has a constant first diameter and the second portion of the helical spring has a constant second diameter, the second diameter being smaller than the first diameter; and
   a mesh bag for releasably covering and receiving the at least one first plate, the second plate and the helical spring,
   whereby the second portion of the helical spring is sized and shaped for releasably holding a free end of a suction strainer received within an interior of the helical spring through the central opening of the at least one first plate.

7. The fish screen for a suction strainer as recited in claim 6, wherein each of the at least one first plate and the second plate has a circular contour.

8. The fish screen for a suction strainer as recited in claim 6, wherein the mesh bag has a drawstring for releasably sealing an opening of the mesh bag about a hose attached to the suction strainer.

9. A fish screen for a suction strainer, comprising:
   at least one first plate having a central opening formed therethrough;
   a second plate;
   a helical spring having opposed first and second ends, the first end being secured to the at least one first plate and the second end being secured to the second plate, the helical spring having first and second portions positioned respectively adjacent to the first and second ends, wherein the helical spring has a tapered contour such that a diameter of the second portion is less than a diameter of the first portion; and
   a mesh bag for releasably covering and receiving the at least one first plate, the second plate and the helical spring,
   whereby the second portion of the helical spring is sized and shaped for releasably holding a free end of a suction strainer received within an interior of the helical spring through the central opening of the at least one first plate.

10. The fish screen for a suction strainer as recited in claim 9, wherein each of the at least one first plate and the second plate has a circular contour.

11. The fish screen for a suction strainer as recited in claim 9, wherein the mesh bag has a drawstring for releasably sealing an opening of the mesh bag about a hose attached to the suction strainer.

* * * * *